United States Patent
Gao et al.

(10) Patent No.: US 9,961,694 B2
(45) Date of Patent: May 1, 2018

(54) DUAL BAND COMMUNICATION METHOD AND WLAN DEVICE

(71) Applicant: Huawei Technologies Co., Ltd., Shenzhen (CN)

(72) Inventors: Lin Gao, Shenzhen (CN); Wenjun Li, Shenzhen (CN); Yuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 14/986,209

(22) Filed: Dec. 31, 2015

(65) Prior Publication Data

US 2016/0192381 A1 Jun. 30, 2016

(30) Foreign Application Priority Data

Dec. 31, 2014 (CN) .......................... 2014 1 0856573

(51) Int. Cl.
*H04W 72/12* (2009.01)
*H04W 72/04* (2009.01)
(Continued)

(52) U.S. Cl.
CPC .......... *H04W 72/12* (2013.01); *H04B 1/0067* (2013.01); *H04J 3/1694* (2013.01);
(Continued)

(58) Field of Classification Search
CPC ............. H04W 72/12; H04W 72/0493; H04W 72/0446; H04W 72/0453; H04W 72/08; H04W 84/12; H04L 47/72; H04J 3/1694
(Continued)

(56) References Cited

U.S. PATENT DOCUMENTS

2003/0207668 A1* 11/2003 McFarland .......... H03H 7/0153
455/3.01
2004/0127185 A1* 7/2004 Abrahams .............. H04B 1/005
455/277.1
(Continued)

FOREIGN PATENT DOCUMENTS

| CN | 103841623 A | 6/2014 |
|---|---|---|
| CN | 104125615 A | 10/2014 |
| WO | 2011046703 A2 | 4/2011 |

OTHER PUBLICATIONS

Foreign Communication From a Counterpart Application, European Application No. 15202904.7, Extended European Search Report dated Sep. 26, 2016, 5 pages.
(Continued)

*Primary Examiner* — Faruk Hamza
*Assistant Examiner* — Jean F Voltaire
(74) *Attorney, Agent, or Firm* — Conley Rose, P.C.

(57) ABSTRACT

A dual band communication method and a wireless local area network (WLAN) device, First determining a service type of a service in a switching period according to a preset policy, where the switching period includes one first timeslot in which a first radio frequency (RF) channel works and one adjacent second timeslot in which a second RF channel works, and determining, according to the determined service type and a preset service quality requirement corresponding to the service type, maximum duration of the switching period in which the service quality requirement is met, and when time division multiplexing (TDM) is performed on a baseband processor, controlling the switching between the first RF channel and the second RF channel according to the maximum duration, hence actual duration of the switching period is less than or equal to the maximum duration.

24 Claims, 14 Drawing Sheets

(51) Int. Cl.
　　　*H04W 72/08* (2009.01)
　　　*H04L 12/911* (2013.01)
　　　*H04J 3/16* (2006.01)
　　　*H04W 84/12* (2009.01)
　　　*H04B 1/00* (2006.01)
　　　*H04L 5/00* (2006.01)

(52) U.S. Cl.
　　　CPC .......... *H04L 5/0064* (2013.01); *H04L 5/0076* (2013.01); *H04L 47/72* (2013.01); *H04W 72/0446* (2013.01); *H04W 72/0453* (2013.01); *H04W 72/0493* (2013.01); *H04W 72/08* (2013.01); *H04W 84/12* (2013.01)

(58) Field of Classification Search
　　　USPC .................................................. 370/328–332
　　　See application file for complete search history.

(56) References Cited

U.S. PATENT DOCUMENTS

| | | | |
|---|---|---|---|
| 2015/0092736 A1* | 4/2015 | Damodaran | H04W 72/1215 370/330 |
| 2015/0223243 A1* | 8/2015 | Tabet | H04W 28/085 370/330 |
| 2016/0044705 A1 | 2/2016 | Gao et al. | |

OTHER PUBLICATIONS

Machine Translation and Abstract of Chinese Publication No. CN103841623, Jun. 4, 2014, 9 pages.
Foreign Communication From a Counterpart Application, Chinese Application No. 201410856573.4, Chinese Office Action dated Sep. 29, 2017, 5 pages.

\* cited by examiner

DUAL BAND COMMUNICATION METHOD AND WLAN DEVICE

CROSS-REFERENCE TO RELATED APPLICATION

This application claims priority to Chinese Patent Application No. 201410856573.4, filed on Dec. 31, 2014, which is hereby incorporated by reference in its entirety.

TECHNICAL FIELD

Embodiments of the present disclosure relate to the field of communications technologies, and in particular, to a dual band communication method and a wireless local area network (WLAN) device.

BACKGROUND

Existing communications devices may be classified, according to supported bands and concurrent manners of different bands, into the following types: single band single concurrent (SBSC) device, dual band single concurrent (DBSC) device, and dual band dual concurrent (DBDC) device. The SBSC device integrates with one set of Media Access Control (MAC) layer/physical (PHY) layer/radio frequency (RF), where the RF has only one set of radio frequency channel, which may work at only one band, which generally is a 2.4 gigahertz (GHz) band. The DBSC device integrates with one set of MAC/PHY/RF, where the RF has two sets of radio frequency channels, one set of radio frequency channel supports 2.4 GHz, and the other set of radio frequency channel supports 5 GHz. A DBSC device may be switched to either the band of 2.4 GHz or the band of 5 GHz, and cannot work at the two bands at the same time. A DBDC device integrates with two sets of MAC/PHY/RF, where the RF has two sets of radio frequency channels, which work at 2.4 GHz and 5 GHz respectively, and may work at the 2.4 GHz and 5 GHz bands simultaneously. However, the DBDC has relatively high cost. Therefore, in the prior art, dynamic switching between 2.4 GHz and 5 GHz is usually performed by means of DBSC, to achieve the effect of time division multiplexing (TDM) communication at the two bands, and this manner may be referred to as dual band adaptive concurrent (DBAC).

Although a communications device is switched between the 2.4 GHz and 5 GHz bands by means of the DBAC, so that the communications device satisfies a requirement that communication is performed at the two 2.4 GHz and 5 GHz bands at the same time, in the prior art, a timeslot allocation manner used when the communications device controls switching between the two bands is mainly: allocating fixed timeslots to the two 2.4 GHz and 5 GHz bands. However, in actual communication, it usually occurs that for the two 2.4 GHz and 5 GHz bands, there are many services at one band, and few services at the other band. For example, there are many to-be-processed packets at 2.4 GHz, and few to-be-processed packets at 5 GHz. The packets at 2.4 GHz need to be executed according to a sequence of a software queue, and there are many packets in the queue, but the timeslot of 2.4 GHz is fixed, and when it is time to switch to 5 GHz, there may be many packets not processed yet, and these packets need to wait for the next period, which prolongs a packet waiting time. However, a real-time service (such as a video service or a voice service) is a service sensitive to a delay, and a longer delay may cause a decrease in quality of service (QoS).

SUMMARY

Embodiments of the present disclosure provide a dual band communication method and a WLAN device, which can resolve a problem of low QoS caused by the use of method of allocating a fixed timeslot.

According to a first aspect, a dual band communication method is provided, applied in a WLAN device, where the WLAN device includes: a baseband processor, a first radio frequency channel, and a second radio frequency channel, where the first radio frequency channel works at a first band, the second radio frequency channel works at a second band, and the first radio frequency channel and the second radio frequency channel share the baseband processor in a time division multiplexing manner, where the method includes: determining a service type of a service in a switching period according to a preset policy, where the switching period includes one first timeslot in which the first radio frequency channel works and one adjacent second timeslot in which the second radio frequency channel works, and the service type is voice service, video service, or data service; determining, according to the determined service type and a preset service quality requirement corresponding to the service type, maximum duration of the switching period in which the service quality requirement is met; and when time division multiplexing is performed on the baseband processor, controlling switching between the first radio frequency channel and the second radio frequency channel according to the maximum duration, so that actual duration of the switching period is less than or equal to the maximum duration. With reference to the first aspect, in a first possible implementation manner, a service in the first timeslot is a service at the first band, and a service in the second timeslot is a service at the second band; and the determining a service type of a service in a switching period according to a preset policy includes: if respective service types of the service at the first band and the service at the second band include at least voice service, determining that the service type of the service in the switching period is voice service; if respective service types of the service at the first band and the service at the second band include at least video service and do not include voice service, determining that the service type of the service in the switching period is video service; or if respective service types of the service at the first band and the service at the second band include only data service, determining that the service type of the service in the switching period is data service.

With reference to the first aspect, in a second possible implementation manner, a previous switching period of the switching period includes a service at the first band and a service at the second band, the service at the first band is a service in a first timeslot of the previous switching period, and the service at the second band is a service in a second timeslot of the previous switching period. The determining a service type of a service in a switching period according to a preset policy includes, when respective service types of the service at the first band and the service at the second band in the previous switching period include at least voice service, determining that the service type of the service in the switching period is voice service. When respective service types of the service at the first band and the service at the second band in the previous switching period include at least video service and do not include voice service, determining that the service type of the service in the switching period is video service. When respective service types of the service at the first band and the service at the second band in the previous switching period include only data service, determining that the service type of the service in the switching period is data service.

With reference to the first or second possible implementation manner of the first aspect, in a third possible implementation manner, when the service type is voice service, the preset service quality requirement corresponding to the service type includes, a maximum allowable delay L of a service packet of a voice service. A time L1 in which the service packet of the voice service contends for a wireless channel, and a time L2 for which the service packet of the voice service occupies the wireless channel for transmission, and for the determining. According to the determined service type and a preset service quality requirement corresponding to the service type, maximum duration of the switching period in which the service quality requirement is met includes a difference, L3, obtained by subtracting L1 and L2 from L as the maximum duration, where $L3=L-L1-L2$.

With reference to the first or second possible implementation manner of the first aspect, in a fourth possible implementation manner, when the service type is video service, the preset service quality requirement corresponding to the service type includes, a maximum allowable delay M of a service packet of a video service. A time M1 in which the service packet of the video service contends for a wireless channel, and a time M2 for which the service packet of the video service occupies the wireless channel for transmission, and for the determining. According to the determined service type and a preset service quality requirement corresponding to the service type, maximum duration of the switching period in which the service quality requirement is met includes a difference, M3, obtained by subtracting M1 and M2 from M as the maximum duration, where $M3=M-M1-M2$.

With reference to the first or second possible implementation manner of the first aspect, in a fifth possible implementation manner, when the service type is data service, the preset service quality requirement corresponding to the service type includes a time N reserved in duration information in a clear to send-to-self packet (CTS-to-Self) when a CTS-to-Self, protection mechanism is started for data service, and the determining, according to the determined service type and a preset service quality requirement corresponding to the service type. Maximum duration of the switching period in which the service quality requirement is met includes the use of 2N as the maximum duration.

According to a second aspect, a dual band communication method is provided, and applied in a WLAN device. The WLAN device includes, a baseband processor, a first RF channel, and a second RF channel, where the first RF channel works at a first band, and the second RF channel works at a second band, while both the RF channels share the baseband processor in a TDM manner. The method includes acquiring duration T of a beacon period, a preset time point t1 at which a first beacon frame is sent, and a preset time point t2 at which a second beacon frame is sent. The beacon period includes at least two switching periods, the first beacon frame is a beacon frame corresponding to a service at the first band, and the second beacon frame is a beacon frame corresponding to a service at the second band. Determining a service type of a service in the beacon period, where the type of the service in the beacon period is types of services in the at least two switching periods, to determine, using the method described in the first aspect or any one of the foregoing implementation manners of the first aspect. Maximum duration of any switching period corresponding to the service type, controlling of switching between the first RF channel and the second RF channel in the beacon period according to T, t1, t2, and respective maximum duration of the at least two switching periods. Hence, the actual duration of each switching period does not exceed the maximum duration. A sum of respective actual duration of the at least two switching periods is equal to T, t1 is in a first timeslot of any switching period in the beacon period, t2 is in a second timeslot of any switching period in the beacon period, and a time difference between t1 and t2 is less than or equal to a time N reserved in duration information in a CTS-to-Self packet when a CTS-to-Self protection mechanism is started. The first timeslot is a timeslot in which the first RF channel works, and the second timeslot is a timeslot in which the second RF channel works.

With reference to the second aspect, in a first possible implementation manner, the method further includes determining a minimum quantity of switching times according to the service type of the service in the beacon period and the maximum duration, where the minimum quantity of switching times indicates a quantity of switching times in the at least two switching periods.

With reference to the first possible implementation manner of the second aspect, in a second possible implementation manner, the determining a minimum quantity of switching times according to the service type of the service in the beacon period and the maximum duration includes when the service type of the service in the beacon period is voice service or video service, dividing the duration of the beacon period by the maximum duration to obtain a quotient, rounding up the quotient, and multiplying, by two, a result obtained by rounding up, to obtain the minimum quantity of switching times. When the service type of the service in the beacon period is data service, acquiring the minimum quantity of switching times according to a timeslot proportion of the first timeslot or the second timeslot of any switching period in the beacon period, and a preset correspondence between a timeslot proportion interval and a quantity of switching times. The timeslot proportion of the first timeslot is a ratio of duration of the first timeslot of any switching period to the actual duration of any switching period, and the timeslot proportion of the second timeslot is a ratio of duration of the second timeslot of any switching period to the actual duration of any switching period.

With reference to the second possible implementation manner of the second aspect, in a third possible implementation manner, the correspondence between a timeslot proportion interval and a quantity of switching times includes at least a correspondence between a first quantity of switching times and a first proportion interval, and a correspondence between a second quantity of switching times and another proportion interval except the first proportion interval; and the acquiring the minimum quantity of switching times according to a timeslot proportion of the first timeslot or the second timeslot of any switching period in the beacon period, and a preset correspondence between a timeslot proportion interval and a quantity of switching times includes determining a proportion interval to which the timeslot proportion of the first timeslot or the second timeslot belongs. When the timeslot proportion of the first timeslot or the second timeslot belongs to the first proportion interval, the minimum quantity of switching times is the first quantity of switching times. When the timeslot proportion of the first timeslot or the second timeslot does not belong to the first proportion interval, the minimum quantity of switching times is the second quantity of switching times.

According to a third aspect, a WLAN device is provided, where the WLAN device includes a baseband processor, a first radio frequency channel, and a second radio frequency channel, where the first radio frequency channel works at a first band, the second radio frequency channel works at a second band, and the first radio frequency channel and the second radio frequency channel share the baseband processor in a time division multiplexing manner; the WLAN device further includes: a controller that is coupled to the first radio frequency channel and the second radio frequency channel, where the controller includes: a service identification unit, configured to determine a service type of a service in a switching period according to a preset policy, where the switching period includes one first timeslot in which the first radio frequency channel works and one adjacent second timeslot in which the second radio frequency channel works, and the service type is voice service, video service, or data service. A duration determining unit configured to determine, according to the determined service type and a preset service quality requirement corresponding to the service type, maximum duration of the switching period in which the service quality requirement is met; and a switching control unit, configured to: when time division multiplexing is performed on the baseband processor, control switching between the first radio frequency channel and the second radio frequency channel according to the maximum duration, so that actual duration of the switching period is less than or equal to the maximum duration.

With reference to the third aspect, in a first possible implementation manner, a service in the first timeslot is a service at the first band, and a service in the second timeslot is a service at the second band. The service identification unit is specifically configured when respective service types of the service at the first band and the service at the second band include at least voice service, determine that the service type of the service in the switching period is voice service. When the respective service types of the service at the first band and the service at the second band include at least video service and do not include voice service, determine that the service type of the service in the switching period is video service. When the respective service types of the service at the first band and the service at the second band include only data service, determine that the service type of the service in the switching period is data service.

With reference to the third aspect, in a second possible implementation manner, a previous switching period of the switching period includes a service at the first band and a service at the second band. The service at the first band is a service in a first timeslot of the previous switching period, and the service at the second band is a service in a second timeslot of the previous switching period. The service identification unit is specifically configured when respective service types of the service at the first band and the service at the second band in the previous switching period include at least voice service, determine that the service type of the service in the switching period is voice service. When respective service types of the service at the first band and the service at the second band in the previous switching period include at least video service and do not include voice service, determine that the service type of the service in the switching period is video service. When respective service types of the service at the first band and the service at the second band in the previous switching period include only data service, determine that the service type of the service in the switching period is data service.

With reference to the first or second possible implementation manner of the third aspect, in a third possible implementation manner, if the service type is voice service, the preset service quality requirement corresponding to the service type includes a maximum allowable delay $L$ of a service packet of a voice service, a time $L1$ in which the service packet of the voice service contends for a wireless channel, and a time $L2$ for which the service packet of the voice service occupies the wireless channel for transmission. The duration determining unit is specifically configured to use a difference $L3$ obtained by subtracting $L1$ and $L2$ from $L$ as the maximum duration, where $L3=L-L1-L2$.

With reference to the first or second possible implementation manner of the third aspect, in a fourth possible implementation manner, if the service type is video service, the preset service quality requirement corresponding to the service type includes: a maximum allowable delay $M$ of a service packet of a video service, a time $M1$ in which the service packet of the video service contends for a wireless channel, and a time $M2$ for which the service packet of the video service occupies the wireless channel for transmission, and the duration determining unit is specifically configured to use a difference $M3$ obtained by subtracting $M1$ and $M2$ from $M$ as the maximum duration, where $M3=M-M1-M2$.

With reference to the first or second possible implementation manner of the third aspect, in a fifth possible implementation manner, if the service type is data service, the preset service quality requirement corresponding to the service type includes a time $N$ reserved in duration information in a CTS-to-Self packet when a CTS-to-Self, protection mechanism is started for data service, and the duration determining unit is specifically configured to use $2N$ as the maximum duration.

According to a fourth aspect, a WLAN device is provided, where the WLAN device includes a baseband processor, a first radio frequency channel, and a second radio frequency channel, where the first radio frequency channel works at a first band, the second radio frequency channel works at a second band, and the first radio frequency channel and the second radio frequency channel share the baseband processor in a time division multiplexing manner; the WLAN device further includes: a controller that is coupled to the first radio frequency channel and the second radio frequency channel, where the controller includes: an acquiring unit configured to acquire duration $T$ of a beacon period, a preset time point $t1$ at which a first beacon frame is sent, and a preset time point $t2$ at which a second beacon frame is sent, where the beacon period includes at least two switching periods, the first beacon frame is a beacon frame corresponding to a service at the first band, and the second beacon frame is a beacon frame corresponding to a service at the second band; a duration determining unit configured to determine a service type of a service in the beacon period, where the type of the service in the beacon period is types of services in the at least two switching periods. To determine, using the method described in the first aspect or any one of the foregoing implementation manners of the first aspect, maximum duration of any switching period corresponding to the service type; and a switching control unit configured to control switching between the first radio frequency channel and the second radio frequency channel in the beacon period according to $T$, $t1$, $t2$, and respective maximum duration of the at least two switching periods, so that actual duration of each switching period does not exceed the maximum duration, a sum of respective actual duration of the at least two switching periods is equal to $T$, $t1$ is in a first timeslot of any switching period in the beacon period, $t2$ is in a second timeslot of any switching period in the beacon period, and a time difference between $t1$ and $t2$ is less than or equal to a time $N$ reserved in duration information in a CTS-to-Self packet when a clear to CTS-to-Self, protection mechanism is started, where the first timeslot is a timeslot in which the first radio frequency channel works, and the second timeslot is a timeslot in which the second radio frequency channel works.

With reference to the fourth aspect, in a first possible implementation manner, the controller further includes a quantity-of-switching times controlling unit configured to determine a minimum quantity of switching times according to the service type of the service in the beacon period and the maximum duration, where the minimum quantity of switching times indicates a quantity of switching times in the at least two switching periods.

With reference to the first possible implementation manner of the fourth aspect, in a second possible implementation manner, the quantity-of-switching times controlling unit is specifically configured to: if the service type of the service in the beacon period is voice service or video service, divide the duration of the beacon period by the maximum duration to obtain a quotient, round up the quotient, and multiply, by two, a result obtained by rounding up, to obtain the minimum quantity of switching times. When the service type of the service in the beacon period is data service, acquire the minimum quantity of switching times according to a timeslot proportion of the first timeslot or the second timeslot of any switching period in the beacon period, and a preset correspondence between a timeslot proportion interval and a quantity of switching times, where the timeslot proportion of the first timeslot is a ratio of duration of the first timeslot of any switching period to the actual duration of any switching period, and the timeslot proportion of the second timeslot is a ratio of duration of the second timeslot of any switching period to the actual duration of any switching period.

With reference to the second possible implementation manner of the fourth aspect, in a third possible implementation manner, the correspondence between a timeslot proportion interval and a quantity of switching times includes at least a correspondence between a first quantity of switching times and a first proportion interval, and a correspondence between a second quantity of switching times and another proportion interval except the first proportion interval; and the quantity-of-switching times controlling unit is specifically configured to: determine a proportion interval to which the timeslot proportion of the first timeslot or the second timeslot belongs, where if the timeslot proportion of the first timeslot or the second timeslot belongs to the first proportion interval, the minimum quantity of switching times is the first quantity of switching times; or if the timeslot proportion of the first timeslot or the second timeslot does not belong to the first proportion interval, the minimum quantity of switching times is the second quantity of switching times.

In the dual band communication method and the WLAN device provided in the embodiments of the present disclosure, a service type of a service in a switching period is determined according to a preset policy first, where the switching period includes one first timeslot in which a first radio frequency channel works and one adjacent second timeslot in which a second radio frequency channel works; maximum duration of the switching period when the switching period satisfies a service quality requirement is determined according to the determined service type and the preset service quality requirement corresponding to the service type; and when time division multiplexing is performed on a baseband processor, switching between the first radio frequency channel and the second radio frequency channel is controlled according to the maximum duration, so that the actual duration of the switching period is less than or equal to the maximum duration. In this way, the present invention can satisfy service quality requirements of services of different types.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
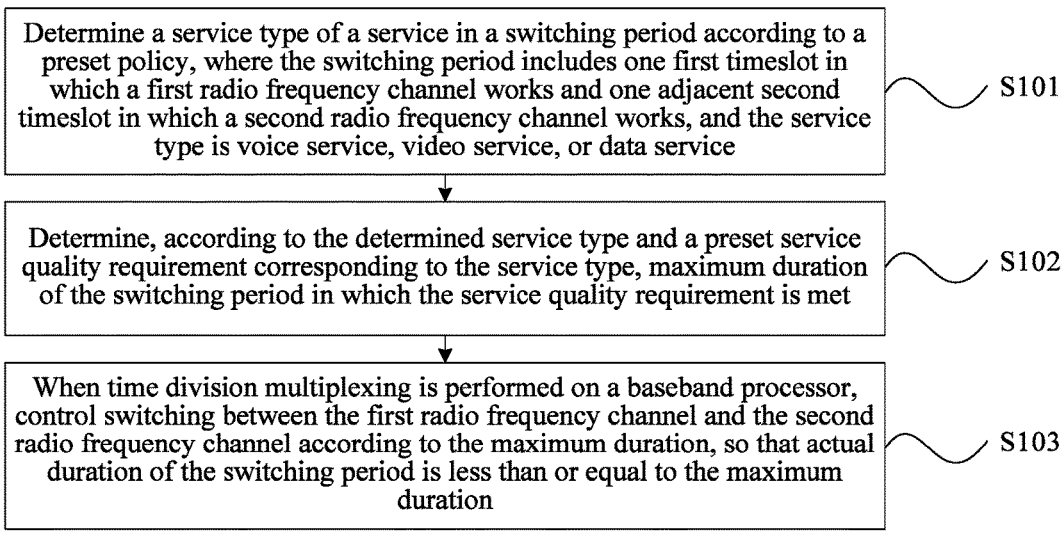
FIG. 1 is a schematic flowchart of a dual band communication method according to an embodiment of the present disclosure.

An embodiment of the present disclosure provides a dual band communication method, applied in a WLAN device, where the WLAN device may include a baseband processor, a first RF channel, and a second RF channel, where the first RF channel works at a first band, the second RF channel works at a second band, and the first RF channel and the second RF channel share the baseband processor in a TDM manner. As shown in FIG. 1, the method includes:

S101: Determine a service type of a service in a switching period according to a preset policy, where the switching period includes one first timeslot in which the first RF channel works and one adjacent second timeslot in which the second RF channel works, and the service type is voice service, video service, or data service.

S102: Determine, according to the determined service type and a preset service quality requirement corresponding to the service type, maximum duration of the switching period in which the service quality requirement is met.

S103: When time division multiplexing is performed on the baseband processor, control switching between the first RF channel and the second RF channel according to the maximum duration, so that actual duration of the switching period is less than or equal to the maximum duration.

Figure 2:
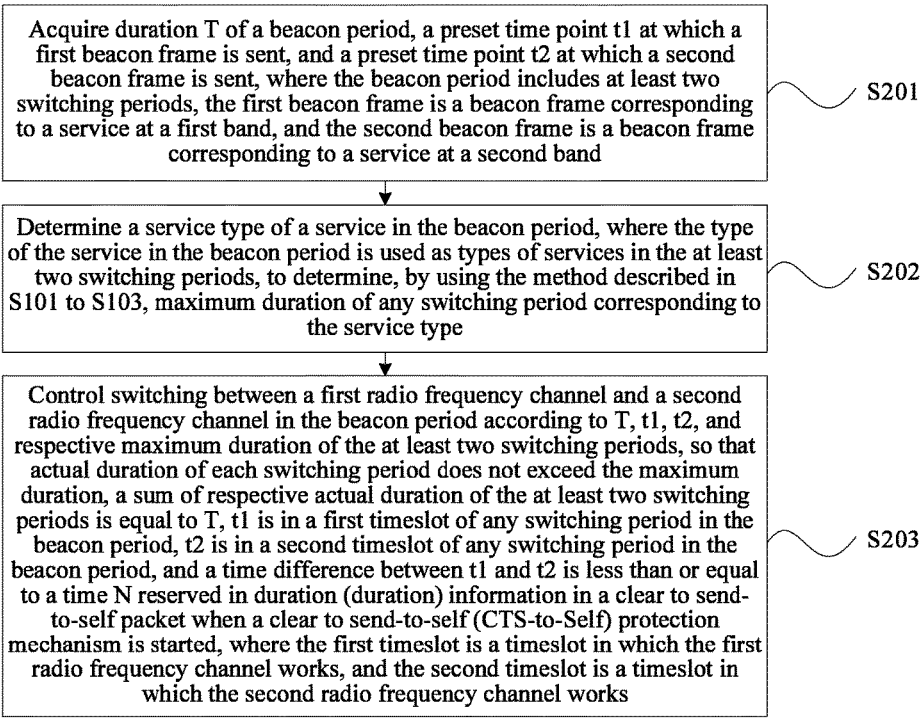
FIG. 2 is a schematic flowchart of another dual band communication method according to an embodiment of the present disclosure.

An embodiment of the present disclosure further provides another dual band communication method, which may also be applied in the foregoing WLAN device. As shown in FIG. 2, the method includes:

S201: Acquire duration T of a beacon period, a preset time point t1 at which a first beacon frame is sent, and a preset time point t2 at which a second beacon frame is sent, where the beacon period includes at least two switching periods, the first beacon frame is a beacon frame corresponding to a service at a first band, and the second beacon frame is a beacon frame corresponding to a service at a second band.

S202: Determine a service type of a service in the beacon period, where the type of the service in the beacon period is types of services in the at least two switching periods, to determine, using the method described in S101 to S103, maximum duration of any switching period corresponding to the service type.

S203: Control switching between the first RF channel and the second RF channel in the beacon period according to T, t1, t2, and respective maximum duration of the at least two switching periods, so that actual duration of each switching period does not exceed the maximum duration, a sum of respective actual duration of the at least two switching periods is equal to T, t1 is in a first timeslot of any switching period in the beacon period, t2 is in a second timeslot of any switching period in the beacon period, and a time difference between t1 and t2 is less than or equal to a time N reserved in duration information in a CTS-to-Self packet when a CTS-to-Self, protection mechanism is started, where the first timeslot is a timeslot in which the first RF channel works, and the second timeslot is a timeslot in which the second RF channel works.

In this embodiment, because one switching period includes one first timeslot in which the first RF channel works and one adjacent second timeslot in which the second RF channel works, a service in the first timeslot is the service at the first band, a service in the second timeslot is the service at the second band, where a service type may include voice service, video service, and data service. Exemplarily, in this embodiment, the first band may be 2.4 GHz, and the second band may be 5 GHz.

In addition, the beacon period may be understood as a beacon period to start soon, and the beacon period may be any beacon period of a plurality of beacon periods of a dual band communication service, where each beacon period has same duration. Persons skilled in the art may understand that the first band and the second band may be other possible bands, which is not limited in this embodiment.

In conclusion, in this embodiment, a service type of a service in a switching period is determined according to a preset policy first, and maximum duration of the switching period when the switching period satisfies a service quality requirement is determined according to the determined service type and the preset service quality requirement corresponding to the service type, so as to control switching between a first RF channel and a second RF channel according to the maximum duration when time division multiplexing is performed on a baseband processor, so that actual duration of the switching period is less than or equal to the maximum duration. In addition, the method may also be used to determine a timeslot structure of a beacon period of dual band communication. The beacon period includes at least two switching periods. Duration T of the beacon period, a preset time point t1 at which a first beacon frame is sent, and a preset time point t2 at which a second beacon frame is sent are acquired, a service type of a service in the beacon period is determined then, to determine, using the method described above, maximum duration of any switching period corresponding to the service type, and finally, switching between the first RF channel and the second RF channel is controlled in the beacon period according to T, t1, t2, and the respective maximum duration of the at least two switching periods, so that a sum of respective actual duration of the at least two switching periods is equal to T, t1 is in a first timeslot of any switching period in the beacon period, and t2 is in a second timeslot of any switching period in the beacon period. In this way, the present disclosure can satisfy service quality requirements of services of different types, and can also improve utilization of time resources.

Figure 3:
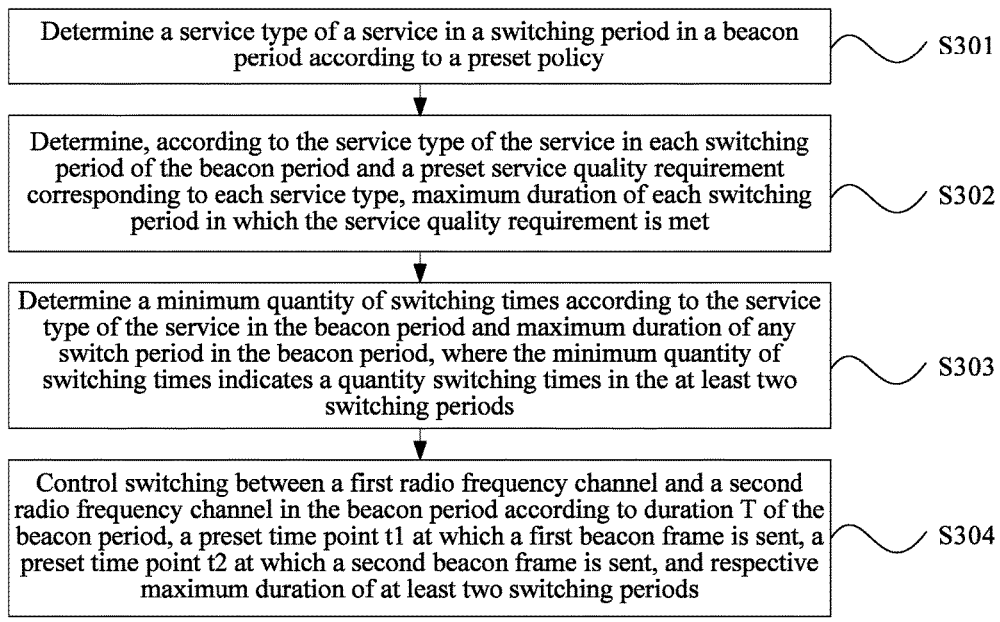
FIG. 3 is a schematic flowchart of still another dual band communication method according to an embodiment of the present disclosure.

To make persons skilled in the art understand the technical solutions provided in the embodiments of the present disclosure more clearly, the following describes, in detail using a specific embodiment, a dual band communication method provided in this embodiment of the present disclosure. As shown in FIG. 3, the method includes:

S301: Determine a service type of a service in a switching period in a beacon period according to a preset policy.

The beacon period includes at least two switching periods, each switching period includes one first timeslot in which a first RF channel works and one adjacent second timeslot in which a second RF channel works. The determining a service type of a service in a switching period in a beacon period herein may be understood as determining a service type of a service in each switching period of the at least two switching periods, where the beacon period may be understood as a beacon period to start soon, the beacon period may be any beacon period of a plurality of beacon periods of dual band communication, where each beacon period has same duration. Exemplarily, in this embodiment, a first band may be 2.4 GHz, and a second band may be 5 GHz.

Specifically, the beacon period is a period that is used for sending a beacon frame in a WLAN dual band service, where in each beacon period, a beacon frame is sent. Using communication at dual bands of 2.4 GHz and 5 GHz as an example, a 2.4 GHz beacon frame and a 5 GHz beacon frame are separately sent in a beacon period.

For example, in a common wireless fidelity (WiFi) network, a WLAN communications device, such as a router, may periodically send a beacon frame, so that a terminal device in a coverage of the router can obtain the beacon frame by means of scanning, so as to identify a WiFi network corresponding to the router, and when connecting to the WiFi network, the terminal device performs synchronization using the obtained beacon frame. The beacon period usually uses a millisecond as a unit, duration of beacon periods is the same, and generally, one beacon period is 100 milliseconds (ms) by default.

For the preset policy that is used to determine a service type of a service in each switching period of the at least two switching periods in the beacon period, there may be the following two manners:

In an implementation manner, for any switching period, a service type of a service in the switch period may be determined according to respective service types of a service at the first band and a service at the second band in the switching period, where the service at the first band is a service in a first timeslot of the switching period, the service at the second band is a service in a second timeslot of the switching period, and the service types of the service at the first band and the service at the second band may include voice service, video service, and data service. Voice service has the highest priority, video service has a lower priority, and data service has the lowest priority; therefore, the preset policy may include: determining that the service type of the service in the switching period is voice service when respective service types of the service at the first band and the service at the second band include at least voice service; determining that the service type of the service in the switching period is video service when respective service types of the service at the first band and the service at the second band include at least video service and do not include voice service; or determining that the service type of the service in the switching period is data service when respective service types of the service at the first band and the service at the second band include only data service.

Alternatively, because relative to duration of a service (especially a voice service and a video service) in entire dual band communication, duration of one switching period is very short, the service is continuous in multiple consecutive switching periods. In this case, considering the foregoing factors, in another implementation manner, for any switching period, a service type of a service in the switch period may be determined according to respective service types of the service at the first band and the service at the second band in a previous switching period of the switching period, where the service at the first band is a service in a first timeslot of the previous switching period, and the service at the second band is a service in a second timeslot of the previous switching period. Similarly, voice service has the highest priority, video service has a lower priority, and data service has the lowest priority; therefore, the preset policy may include: determining that the service type of the service in the switching period is voice service when respective service types of the service at the first band and the service at the second band in the previous switching period include at least voice service; determining that the service type of the service in the switching period is video service when respective service types of the service at the first band and the service at the second band in the previous switching period include at least video service and do not include voice service; or determining that the service type of the service in the switching period is data service when respective service types of the service at the first band and the service at the second band in the previous switching period include only data service.

In addition, it is worth mentioning that as described above, a service in dual band communication is continuous in multiple consecutive switching periods, and relative to the duration of a service (especially a voice service and a video service) in the entire dual band communication, the duration (100 ms) of one beacon period is also very short; therefore, it may also be considered that types of services in multiple switching periods in one beacon period are the same. Therefore, in another implementation manner, a service type of a service in the beacon period may be determined first, where the service type of the service in the beacon period is the service types of the at least two switching periods in the beacon period, and then, a subsequent step S302 is performed.

The service type of the service in the beacon period may be determined using a service type of a service in a previous beacon period of the beacon period, this is also because relative to duration of a service in entire dual band communication, duration (100 ms) of one beacon period is very short, and it may be considered that a service is continuous in multiple consecutive beacon periods.

Exemplarily, a specific determining method may include:

Because the previous beacon period of the beacon period already ends, a quantity of switching periods included in the previous beacon period, and services types of the service at the first band and the service at the second band in each switching period are known. Among voice service, video service, and data service, voice service has the highest priority, video service has a lower priority, and data service has the lowest priority; therefore, determining that the service type of the service in the beacon period is voice service when a service in the previous beacon period of the beacon period includes voice service; determining that the service type of the service in the beacon period is video service when a service in the previous beacon period of the beacon period does not include voice service but includes video service; or determining that the service type of the service in the beacon period is data service when a service in the previous beacon period of the beacon period includes neither voice service nor video service, but includes only data service.

S302: Determine, according to the service type of the service in each switching period of the beacon period and a preset service quality requirement corresponding to each service type, maximum duration of each switching period in which the service quality requirement is met.

Exemplarily, during WiFi communication, a delay of a service packet may be represented as:

$$L=L1+L2+L3 \quad (1);$$

where L represents a delay of a service packet, L1 represents a delay caused by waiting, by the service packet, in a software queue, L2 represents a time in which the service packet contends (in hardware) for a channel (wireless channel), and L3 represents a time for which the service packet occupies the wireless channel for transmission.

As a communications device switches from a band, the delay L1 caused by waiting, in the software queue, by a packet at the band from which the communications device switches increases; therefore, to ensure that the delay L is less than a delay requirement Lmax, it must be ensured that the waiting delay L1 satisfies:

$$L1 \leq Lmax - (L2+L3) \quad (2).$$

Further, the delay requirements Lmax used as service quality indicators of services of different types during WiFi communication are shown in Table 1:

TABLE 1

| Service type | Requirement for a delay during WiFi communication |
|---|---|
| Voice | <25 ms |
| Video | <50 ms |
| Data | <2 s |

Therefore, when a type of a service in any switching period is voice service, a service quality requirement in the switching period includes: a maximum allowable delay L of a service packet of a voice service, a time L1 in which the service packet of the voice service contends (in hardware) for a channel (wireless channel), and a time L2 for which the service packet of the voice service occupies the wireless channel for transmission, where it is assumed that a delay caused by waiting, by the service packet of the voice service, in a software queue is L3.

Figure 4:
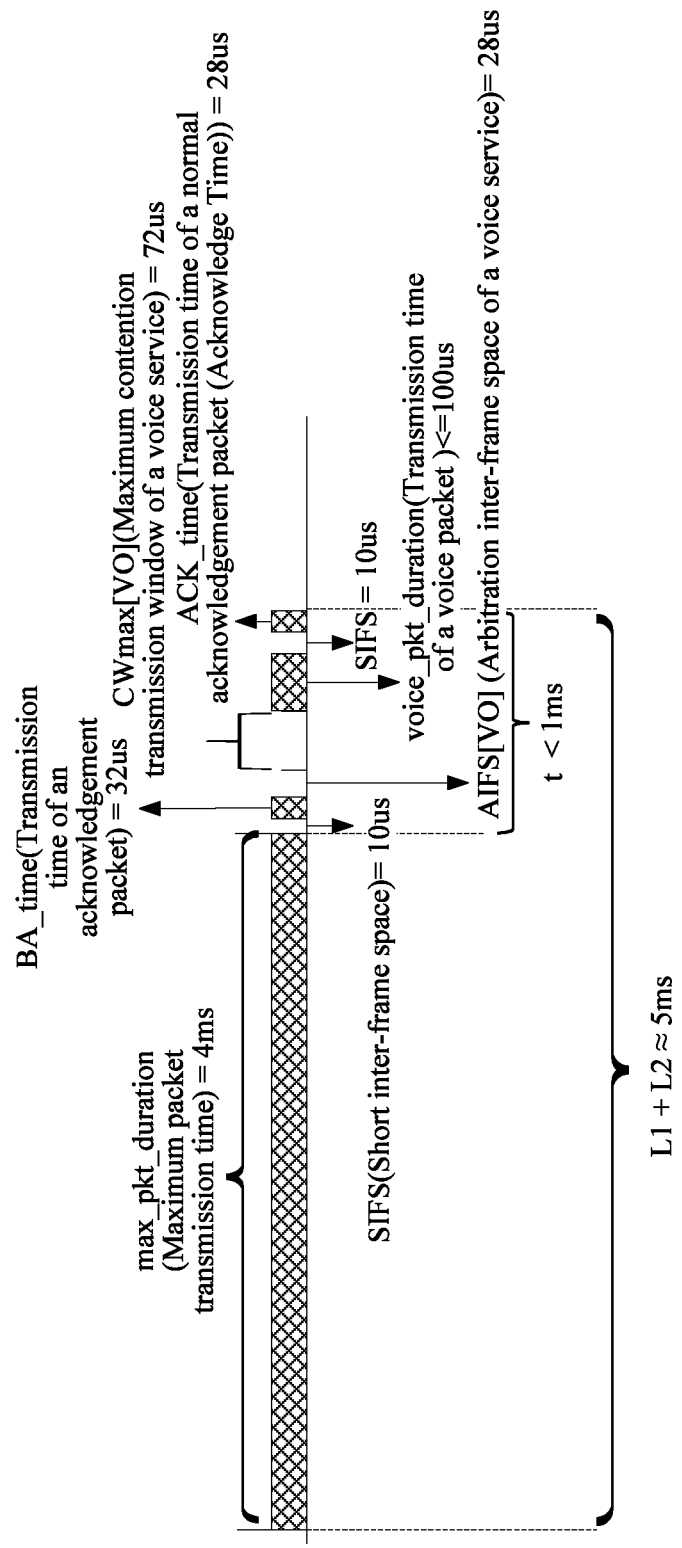
FIG. 4 is a schematic structural diagram of a delay of a voice service according to an embodiment of the present disclosure.

Further, because the service priority of voice service is relatively high, and voice service has a relatively strong channel contention capability, it may be considered that the service packet of the voice service can obtain the channel through contention in the hardware after waiting for a transmission time of one packet. Therefore, according to a frame exchange manner of an 802.11 protocol, a value of L1+L2 of the voice service may be obtained using the following algorithm:

$$L1+L2=(\text{max\_pkt\_duration}+\text{SIFS}+\text{BA\_time})+ \text{AIFS}[VO]+CW\text{max}[VO]+\text{voice\_pkt\_duration}+ \text{SIFS}+\text{ACK} \approx 5 \text{ ms},$$

where max_pkt_duration represents a maximum packet transmission time, voice_pkt_duration represents a transmission time of the voice packet, SIFS represents a short inter-frame space, AIFS[VO] represents an arbitration inter-frame space of the voice service, CWmax[VO] represents a maximum contention transmission window of the voice service, ACK_time represents a transmission time of a normal acknowledgement packet (Acknowledge Time), and BA_time represents a transmission time of a block acknowledgement packet (Block Acknowledge Time), which may be further shown in FIG. 4.

Therefore, for a voice service, L, L1, L2, and L3 are substituted into the formula (2), to obtain that L3 should satisfy that: L3<=L−L1−L2=25 ms−5 ms=20 ms. Because a proportion between timeslots of the service at the first band and the service at the second band in the switching period is adjustable, and the most extreme case in which if the timeslot of the service at the first band accounts for a small proportion, and a voice service packet has arrived when the timeslot of the service at the first band starts, because other service packets at the first band in a software queue are being sent currently, the voice service packet recently received in the current switching period cannot be scheduled, and cannot be scheduled before a next switching period starts. In this case, the delay L3 caused by waiting, by the voice service packet, in the software queue is equal to duration of the switching period, and the waiting delay L3 needs to satisfy L3<20 ms; therefore, L3=20 ms is used as the maximum duration of the switching period, where L3=L−L1−L2.

When a type of a service in any switching period is video service, a service quality requirement in the switching period includes: a maximum allowable delay M of a service packet of a video service, a time M1 in which the service packet of the video service contends (in hardware) for a channel (wireless channel), and a time M2 for which the service packet of the video service occupies the wireless channel for transmission, where it is assumed that a delay caused by waiting, by the service packet of the video service, in the software queue is M3.

Figure 5:
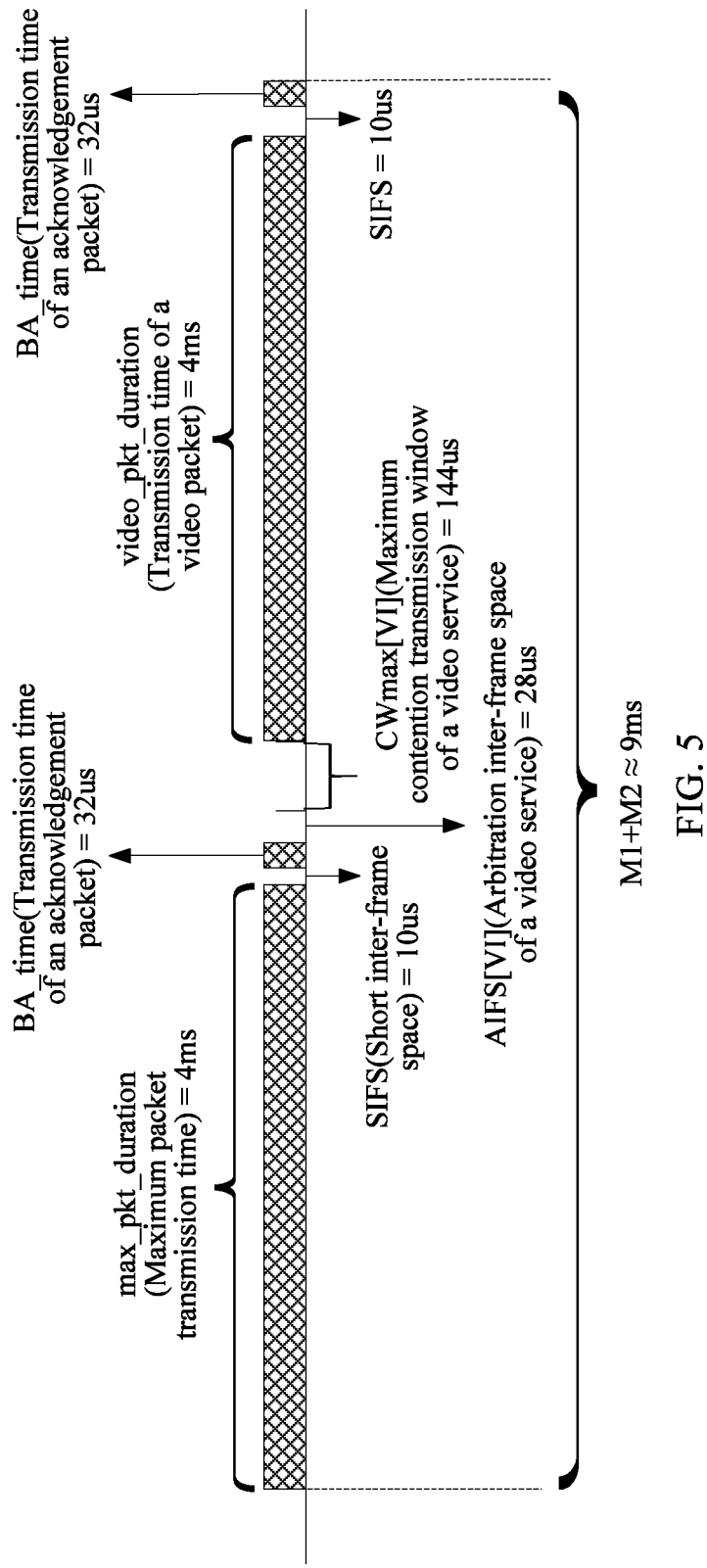
FIG. 5 is a schematic structural diagram of a delay of a video service according to an embodiment of the present disclosure.

Further, the video service is similar to the voice service, and it may also be considered that the service packet of the video service can obtain the channel through contention in the hardware after waiting for a transmission time of one packet. However, because the video service packet has a relatively large quantity of bytes, in calculation, a maximum packet transmission time may be considered as 4 ms, and in addition, a maximum contention transmission window of the video service packet is also longer than that of the voice service. Similarly, according to the frame exchange manner in the 802.11 protocol, a value of M1+M2 of the video service may be obtained using the following algorithm:

$$M1+M2=(\text{max\_pkt\_duration}+\text{SIFS}+\text{BA})+\text{AIFS}[VI]+ CW\text{max}[VI]+\text{video\_pkt\_duration}+\text{SIFS}+ \text{BA} \approx 9 \text{ ms},$$

where max_pkt_duration represents a maximum packet transmission time, video_pkt_duration represents a transmission time of the video packet, SIFS represents a short inter-frame space, AIFS[VI] represents an arbitration inter-frame space of the video service, CWmax[VI] represents a maximum contention transmission window of the video service, ACK_time represents a transmission time of a normal acknowledgement packet, and BA_time represents a transmission time of a block acknowledgement packet, which may be further shown in FIG. 5.

In addition, considering a subframe error rate of 10% of aggregate media access control (MAC) protocol data unit (AMPDU, one of frame aggregation technologies) of a video service packet, a time of 1 ms for retransmitting an error subframe is reserved; therefore, M1+M2≈10 ms.

Therefore, for the video service, M, M1, M2, and M3 are substituted into the formula (2), to obtain that M3 should satisfy: M3<=M−M1−M2=50 ms−10 ms=40 ms. Similarly, an extreme case is considered, and M3=40 ms is used as the maximum duration of the switching period, which is similar to that of the voice service, where M3=M−M1−M2.

If a type of a service in any switching period is data service, a service quality requirement in the switching period includes: a time N reserved in duration information in a CTS-to-Self packet when a CTS-to-Self, protection mechanism is started for data service.

In this case, 2N is used as the maximum duration of the switching period.

Furthermore, as can be seen from Table 1, a delay requirement of a data service is lower than delay requirements of a voice service and a video service, and it is only required that the delay does not exceed 2 s. However, before the communications device is switched from a band, an "offline protection" mechanism needs to be used, that is, a peer end device at this band is notified of a switching time, to avoid packet loss caused by communication initiated by the peer end device. According to an 802.11 protocol, in a general "offline protection" manner, CTS-to-Self, protection mechanism is started, to send a CTS-to-Self message, where the CTS-to-Self message carries duration information in which a channel time can be reserved for the communications device. According to the protocol, a maximum time that can be reserved in the duration information is 32 ms, and it may be understood as that a time in which the communications device may be switched from the current band does not exceed 32 ms; therefore, for the two bands, a sum of lengths of timeslots of the two bands is 64 ms to the most, and the maximum duration of the switching period is 64 ms.

In conclusion, in any switching period, when a type of a service in the switching period is voice service, a maximum duration of the switching period is 20 ms; when a type of a service in the switching period is video service, a maximum duration of the switching period is 40 ms; when a type of a service in the switching period is data service, a maximum duration of the switching period is 64 ms. For different services, duration of a switching period in a beacon period is limited using the foregoing method, so as to satisfy a delay requirement of different services on service quality.

In addition, it is worth mentioning that because for a beacon period, before the beacon period starts, a quantity of switching periods in the beacon period is indeterminate, and a type of a service in each switching period is unknown; in this case, a service type of a service in the beacon period may be determined first, the service type is used as types of services in the at least two switching periods in the beacon period, and then maximum duration of each switching period in the beacon period is acquired according to the service type using the method in S302, where the switching periods in the beacon period have same maximum duration.

In addition, in a DBAC mechanism, in addition to that a delay caused by band switching affects QoS, timeslot division of a band also affects QoS, when the timeslot is too short, it may cause that switching between bands is performed too frequently, and overheads caused by band switching are excessively large. Therefore, timeslots of services at different bands in different beacon periods need to be obtained by means of appropriate division with reference to the duration of switching periods of the foregoing different services, so that delays for different services and a quantity of band switching times both satisfy QoS requirements.

S303: Determine a minimum quantity of switching times according to a service type of a service in the beacon period and the maximum duration of any switch period in the beacon period, where the minimum quantity of switching times indicates a quantity of switching times in the at least two switching periods.

When the service type of the service in the beacon period is voice service or video service, duration of the beacon period is divided by the maximum duration of any beacon period in the beacon period to obtain a quotient, the quotient is rounded up, and a result obtained by rounding up is multiplied by two, to obtain the minimum quantity of switching times. Certainly, the maximum duration herein is maximum duration corresponding to voice service or video service.

For example, when the service type of the service in the beacon period is voice service, because the maximum duration of the switching period of voice service is 20 ms, and duration of the beacon period is 100 ms, 100 ms is divided by 20 to obtain 5, 5 is then multiplied by 2 to obtain a minimum quantity 10 of switching times, that is, the beacon period should include five switching periods.

When the service type of the service in the beacon period is video service, because the maximum duration of the switching period of voice service is 40 ms, and the duration of the beacon period is 100 ms, 100 ms is divided by 40 to obtain 2.5, 2.5 is rounded up to obtain 3, and 3 is then multiplied by 2 to obtain a minimum quantity 6 of switching times, that is, the beacon period should include three switching periods.

When the service type of the service in the beacon period is data service, the minimum quantity of switching times is acquired according to a timeslot proportion of the first timeslot or the second timeslot of any switching period in the beacon period, and a preset correspondence between a timeslot proportion interval and a quantity of switching times.

The correspondence between the timeslot proportion interval and the quantity of switching times includes: at least a correspondence between a first quantity of switching times and a first proportion interval, and a correspondence between a second quantity of switching times and another proportion interval except the first proportion interval. Further:

A proportion interval to which the timeslot proportion of the first timeslot or the second timeslot belongs is determined, where when the timeslot proportion of the first timeslot or the second timeslot belongs to the first proportion interval, the minimum quantity of switching times is the first quantity of switching times; or when the timeslot proportion of the first timeslot or the second timeslot does not belong to the first proportion interval, the minimum quantity of switching times is the second quantity of switching times.

The timeslot proportion of the first timeslot is a ratio of duration of the first timeslot of any switching period to actual duration of any switching period, and the timeslot proportion of the second timeslot is a ratio of duration of the second timeslot of any switching period to the actual duration of any switching period. It is worth mentioning that when the step of acquiring the minimum quantity of times is performed, only one of the timeslot proportions of the first timeslot and the second timeslot needs to be known, for example, the timeslot proportion of the first timeslot is p, and then it may be known that the proportion of the timeslot of the service at the second band is 1−p, where if p belongs to [36%, 64%], 1−p also belongs to [36%, 64%].

The first proportion interval, the first quantity of switching times, and the second quantity of switching times are all preset values, for example, the first proportion interval is [36%, 64%], the first quantity of switching times is four, and the second quantity of switching times is six. Exemplarily, specific values of the first quantity of switching times and the second quantity of switching times may be obtained using the following method.

In the data service, according to the foregoing delay requirement, duration of one switching period does not exceed 64 ms (that is, the timeslot of 2.4 GHz or 5 GHz does not exceed 32 ms). In order to reduce frequency of band switching, in each beacon period, 32 ms is directly allocated, as much as possible, to the band having a relatively large proportion of a timeslot, for example, a proportion between timeslots of 2.4 GHz and 5 GHz is X: 1, where X>1; then, 32 ms is allocated to 2.4 GHz, and (32/X) ms is allocated to 5 GHz. In addition, a minimum length of a timeslot may be 8 ms (which is equivalent to a time taken to transmit an aggregate frame once to two times), and it can be obtained that an interval of a proportion of a timeslot that a band accounts for is [8/(32+8), 32/(32+8)]=[20%, 80%]. There are three typical proportions between timeslots in this interval, which are separately 4:1 (a timeslot of the service at the first band accounts for 80%, and a timeslot of the service at the second band accounts for 20%), 1:4 (a timeslot of the service at the first band accounts for 20%, and a timeslot of the service at the second band accounts for 80%), and 1:1 (a timeslot of the service at the first band accounts for 50%, and a timeslot of the service at the second band accounts for 50%). Timeslot structures corresponding to the three proportions may be shown in FIG. 6.

Figure 6:
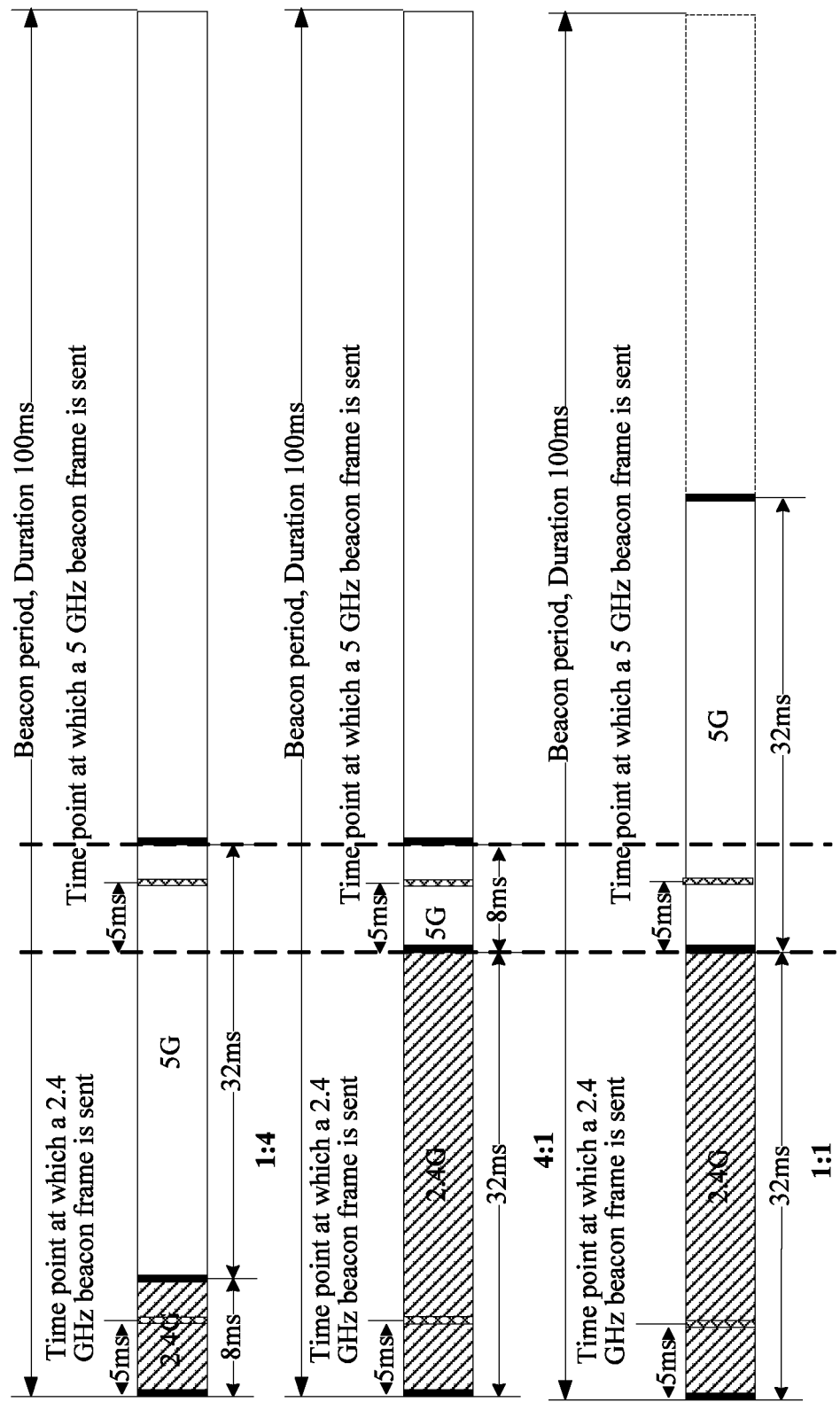
FIG. 6 is a schematic diagram of timeslot structures in a beacon period in which a service type is data service according to an embodiment of the present disclosure.

The timeslot allocation manner shown in FIG. 6 may be referred to as 32:T or T:32. As can be seen from the timeslot structures shown in FIG. 6, no matter which proportion between timeslots is used, the 5 GHz band inevitably exists between 32 ms and 40 ms. In dual-band time division multiplexing of a WiFi network, beacon frames are sent in a fixed period at the first band of 2.4 GHz and the second band of 5 GHz. In order to ensure that a beacon frame can be sent normally and periodically, it needs to be ensured that before a beacon frame is sent at a band, switching to this band for working is complete, and a time needs to be reserved between band switching and beacon frame sending (which generally may be 5 ms). Therefore, because a beacon frame at 5 GHz needs to be sent at a fixed time point in each beacon period, considering 5 ms reserved before sending, the beacon frame at 5 GHz may be arranged to be sent at the $37^{th}$ ms.

In addition, as can be seen from FIG. 6, the proportions 1:4 and 4:1 correspond to a switching period of 40 ms, and 1:1 corresponds to a switching period of 64 ms; and one beacon period is 100 ms; therefore, it can be obtained that a quantity of switching periods that can be included in one beacon period is equal to [100/64, 100/40]=[1, 2.5], where a part after the decimal point actually corresponds to a remaining part in the tail of the beacon period, and this part is referred to as a "remaining period", and correspondingly, a switching period in the front of the beacon period is referred to as a "normal period". [1, 2.5] is rounded up to obtain an interval of [2, 3]; therefore, a quantity of band switching times in one beacon period is four or six.

Further, it may be assumed that a critical value of a proportion of a timeslot is p0, and when a proportion of a timeslot of a band is p0, one beacon period includes only two normal periods, which may be represented as:

$$32+32\times[p0/(1-p0)]=100/2$$

It can be obtained according to the foregoing algorithm that p0=36%. Considering that impact of proportions p0 and 1−p0 of timeslots on duration of a switching period is symmetric, when a proportion of a timeslot of a band is in [p0, 1−p0], that is, the interval of [36%, 64%], band switching needs to be performed four times; when a proportion of a timeslot is in an interval of [20%, 36%) or (64%, 80%], band switching needs to be performed six times.

As can be seen, as a quantity of band switching times is determined, a quantity of switching periods in the beacon period is known, and then the timeslot structure in the beacon period can be obtained by dividing according to the quantity of switching times, a timeslot proportion of the first timeslot or the second timeslot, and maximum duration of the switching period in the beacon period (certainly, a time point at which the first beacon frame is sent and a time point at which the second beacon frame is sent also need to be considered), where the obtained timeslot structure can enable the delay of the data service and the quantity of band switching times to satisfy the service quality requirement. Therefore, during timeslot allocation, the timeslot allocation manner may not be limited to 32:T or T:32, thereby implementing dynamic timeslot allocation, and improving utilization of time resources while satisfying service quality requirements of different services.

S304: Control switching between a first RF channel and a second RF channel in the beacon period according to duration T of the beacon period, a preset time point t1 at which the first beacon frame is sent, a preset time point t2 at which the second beacon frame is sent, and respective maximum duration of the at least two switching periods.

Switching between the first RF channel and the second RF channel is controlled, so that actual duration of each switching period does not exceed the maximum duration, a sum of respective actual duration of the at least two switching periods is equal to T, t1 is in the first timeslot of any switching period in the beacon period, t2 is in the second timeslot of any switching period in the beacon period, and a time difference between t1 and t2 is less than or equal to a time N reserved in the duration information in a CTS-to-Self packet when a CTS-to-Self protection mechanism is started. Exemplarily, T is 100 ms, t1 is the $5^{th}$ ms in the beacon period, t2 is the $37^{th}$ ms in the beacon period, and N is 32 ms.

First, the timeslot structure of the beacon period may be first determined according to the duration T of the beacon period, the preset time point t1 at which the first beacon frame is sent, the preset time point t2 at which the second beacon frame is sent, and respective maximum duration of the at least two switching periods, which specifically includes: when the service type of the service in the beacon period is voice service: considering that in order to satisfy the delay requirement of voice service, duration of the switching period is limited so as not to exceed a first time threshold T1=20 ms, in order to ensure that the first beacon frame and the second beacon frame can be respectively sent at the $5^{th}$ ms and the $37^{th}$ ms, fixed timeslots first need to be separately reserved for the first beacon frame and the second beacon frame in the beacon period, where the fixed timeslot reserved for the first beacon frame is a first timeslot of one switching period, the fixed timeslot reserved for the second beacon frame is a second timeslot of another switching period, and a sum of the fixed timeslots separately reserved for the first beacon frame and the second beacon frame needs to be less than or equal to 20 ms, for example, both the fixed timeslots separately reserved for the first beacon frame and the second beacon frame are 10 ms.

Then, remaining timeslots in the beacon period except the fixed timeslots reserved for the first beacon frame and the second beacon frame are divided into multiple switching periods, where actual duration of each switching period may be preset duration, where the preset duration is less than or equal to 20 ms; in each switching period, duration of the first timeslot=a timeslot proportion p of the first timeslot×actual duration of the switching period, and duration of the second timeslot=a timeslot proportion (1−p) of the second timeslot× actual duration of the switching period.

Figure 7:
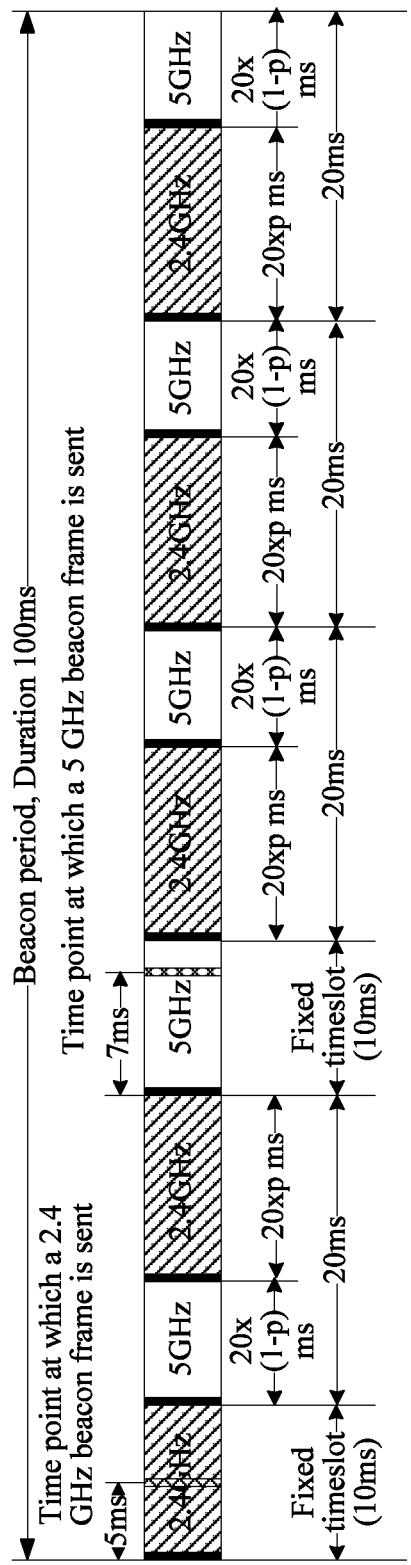
FIG. 7 is another schematic diagram of a timeslot structure in a beacon period in which a service type is voice service according to an embodiment of the present disclosure.

For example, assuming that 0 to 10 ms and 30 to 40 ms are fixed timeslots reserved for the first beacon frame (the 2.4 GHz beacon frame) and the second beacon frame (the 5 GHz beacon frame) respectively, and duration of each of the multiple switching periods that are obtained by dividing the remaining timeslots is 20 ms, and assuming that the timeslot proportion of the first timeslot is p, duration of the first timeslot in each switching period=20×p ms, and duration of the second timeslot=20×(1−p) ms. The timeslot structure satisfies the requirement that the switching period does not exceed 20 ms, and satisfies the requirement that the 2.4 GHz beacon frame is sent at the $5^{th}$ ms, and the 5 GHz beacon frame is sent at the $37^{th}$ ms; a quantity of band switching times in this timeslot structure is 10, which satisfies the requirement that when the service type of the beacon period is voice service, the obtained minimum quantity of switching times is 10, which is a minimum quantity of switching times in a case in which a delay requirement is satisfied. As can be seen, the foregoing timeslot structure can fully satisfy the service quality requirement. The timeslot structure may be shown in FIG. 7.

When the service type of the beacon period is video service: the obtained minimum quantity of switching times is six; therefore, the beacon period may be divided into three switching periods, where actual duration of each switching period is less than or equal to 40 ms; a time point at which the first beacon frame is sent and a time point at which the second beacon frame is sent are included in the first switching period of the three switching periods; in each switching period, duration of the first timeslot=a timeslot proportion p of the first timeslot×the actual duration of the switching period, and duration of the second timeslot=a timeslot proportion (1−p) of the second timeslot×the actual duration of the switching period.

Figure 8:
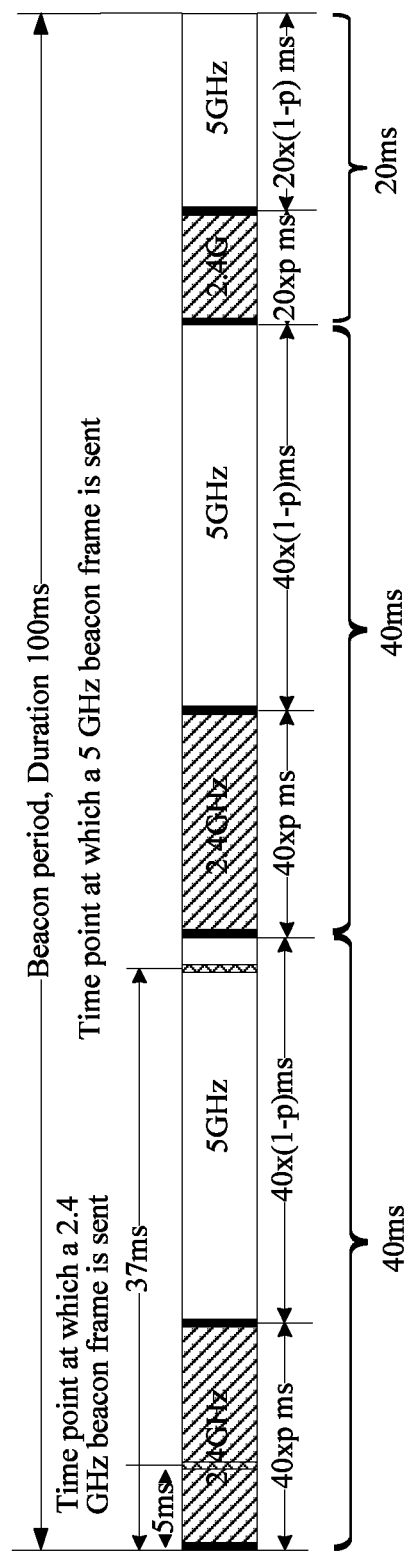
FIG. 8 is still another schematic diagram of a timeslot structure in a beacon period in which a service type is video service according to an embodiment of the present disclosure.

For example, the beacon period may be divided into two switching periods whose duration is 40 ms and one switching period whose duration is 20 ms, which satisfies the requirement that a switching period does not exceed 40 ms. Because a value of p is within [20%, 80%], although it is assumed that p=20%, a 2.4 GHz timeslot of the first switching period is 0 to 8 ms, and a 5 GHz timeslot is 9 to 40 ms. Assuming that p=80%, a 2.4 GHz timeslot of the first switching period is 0 to 32 ms, and a 5 GHz timeslot is 33 to 40 ms. Therefore, using the foregoing timeslot structure, despite a value of p, the requirement that the 2.4 GHz beacon frame is sent at the $5^{th}$ ms, and the 5 GHz beacon frame is sent at the $37^{th}$ ms can always be satisfied, and a quantity of band switching times in this timeslot structure is six, which is a minimum quantity of switching times while satisfying the delay requirement. As can be seen, the timeslot structure can fully satisfy the service quality requirement. The timeslot structure may be shown in FIG. 8.

When the type of the service of the beacon period is data service: when the timeslot proportion (which may be a timeslot proportion of the first timeslot, or may be a timeslot proportion of the second timeslot) is in the first proportion interval [36%, 64%], the minimum quantity of switching times should be four, and the beacon period is divided into two switching periods, where actual duration of each switching period may be preset duration, where the preset duration is less than or equal to 64 ms; a time point at which the first beacon frame is sent and a time point at which the second beacon frame is sent are included in the first switching period of the two switching periods; in each switching period, duration of the first timeslot=a timeslot proportion p of the first timeslot×the actual duration of the switching period, and duration of the second timeslot=a timeslot proportion (1−p) of the second timeslot×the actual duration of the switching period.

Figure 9:
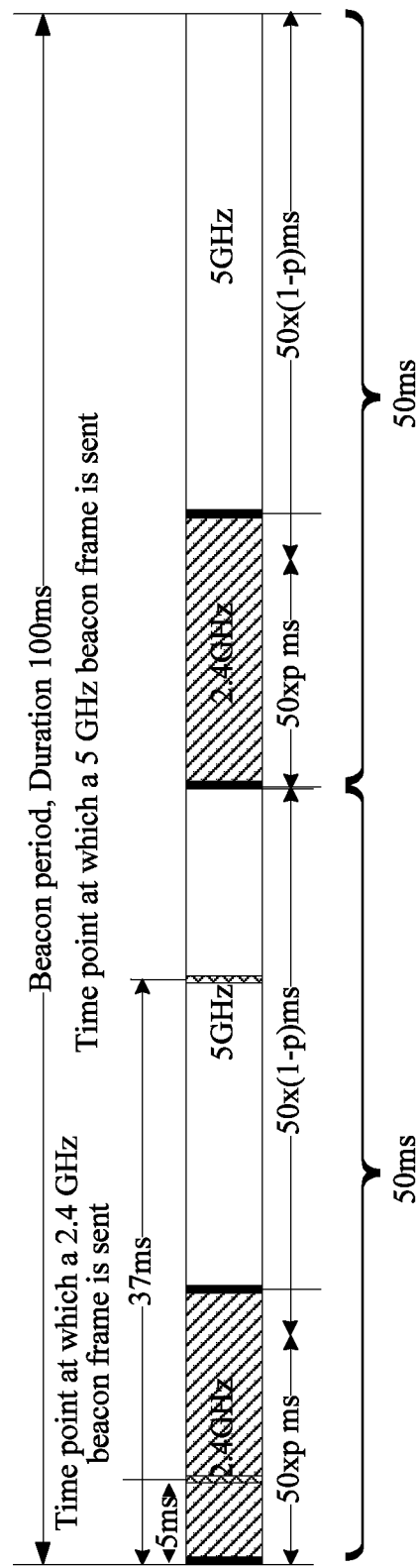
FIG. 9 is a schematic diagram of a timeslot structure in a beacon period in which a service type is data service according to an embodiment of the present disclosure.

For example, assuming that the timeslot proportion of the first timeslot is p, and p belongs to an interval of [36%, 64%], using 2.4 GHz and 5 GHz as an example, the beacon period may be divided into two completely identical switching periods. Because the beacon period is 100 ms, each switching period is 50 ms, which satisfies the requirement that the duration of the switching period does not exceed 64 ms. Assuming that p=36%, a 2.4 GHz timeslot of the first switching period is 0 to 18 ms, and a 5 GHz timeslot is 19 to 50 ms, which apparently can satisfy the requirement that a 2.4 GHz beacon frame is sent at the $5^{th}$ ms, and a 5 GHz beacon frame is sent at the $37^{th}$ ms. Still assuming that p=64%, a 2.4 GHz timeslot of the first switching period is 0 to 32 ms, and a 5 GHz timeslot is 33 to 50 ms, which can also satisfy the requirement of sending a beacon frame, and a quantity of band switching times in the entire beacon period is controlled to be four. As can be seen, when p belongs to the interval of [36%, 64%], the timeslot structure can fully satisfy the service quality requirement. Exemplarily, the timeslot structure may be shown in FIG. 9. In addition to dividing the beacon period into two completely identical switching periods, it may also be preset that one switching period is 64 ms, and the other switching period is 36 ms; or it may be preset that one switching period is 60 ms, and the other switching period is 40 ms, and so on. The foregoing is only exemplary, as long as it can be ensured that when p belongs to the interval of [36%, 64%], a quantity of band switching times is four, and duration of the switching period does not exceed 64 ms, which are not enumerated herein again.

Alternatively, when the timeslot proportion (which may be a timeslot proportion of the first timeslot, or may be a timeslot proportion of the second timeslot) is in another interval except [36%, 64%], for example, is in a proportion interval of [20%, 36%) or a proportion interval of (64%, 80%], the minimum quantity of switching times should be four, and the beacon period may be divided into three switching periods, where actual duration of each switching period may be preset duration, where the preset duration is less than or equal to 64 ms; a time point at which the first beacon frame is sent and a time point at which the second beacon frame is sent are included in the first switching period of the three switching periods; in each switching period, duration of the first timeslot=a timeslot proportion p of the first timeslot×the actual duration of the switching period, and duration of the second timeslot=a timeslot proportion (1−p) of the second timeslot×the duration of the switching period.

Figure 10:
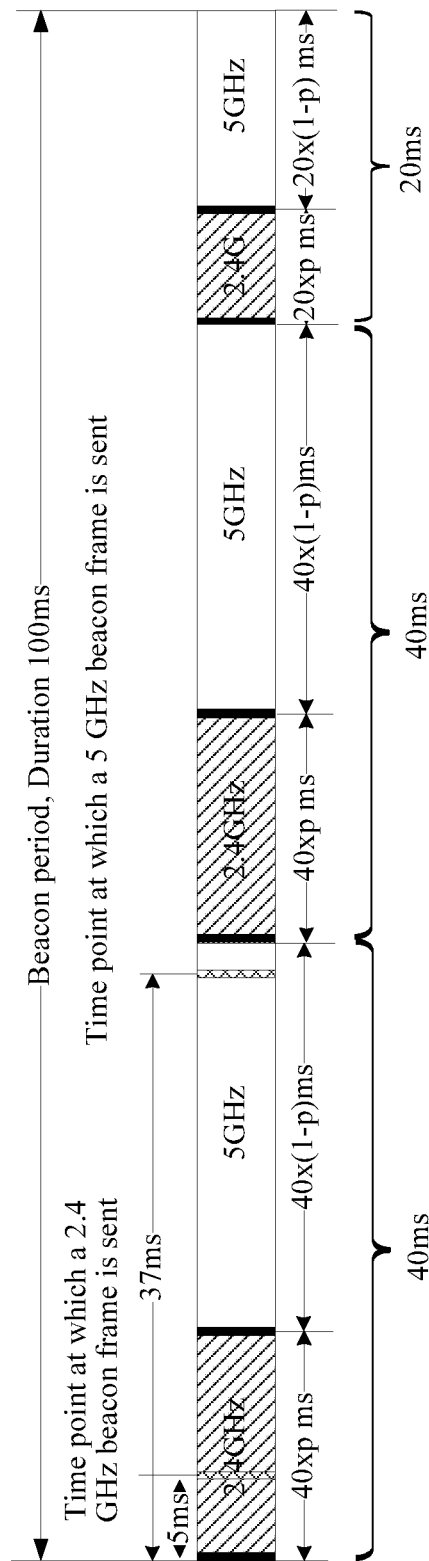
FIG. 10 is a schematic diagram of a timeslot structure in a beacon period in which a service type is data service according to an embodiment of the present disclosure.

For example, still assuming that the acquired timeslot proportion of the first timeslot is p, and p belongs to an interval of [20%, 36%), the beacon period is divided into two switching periods whose duration is 40 ms and one switching period whose duration is 20 ms, which satisfies the requirement that the switching period does not exceed 64 ms. Assuming that p=20%, a 2.4 GHz timeslot of the first switching period is 0 to 8 ms, and a 5 GHz timeslot is 9 to 40 ms, which can apparently satisfy the requirement that a 2.4 GHz beacon frame is sent at the $5^{th}$ ms, and a 5 GHz beacon frame is sent at the $37^{th}$ ms. Still assuming that p=36%, a 2.4 GHz timeslot of the first switching period is 0 to 14 ms, and a 5 GHz timeslot is 16 to 40 ms, which can also satisfy the requirement of sending a beacon frame, and a quantity of band switching times in the entire beacon period is controlled to be six. As can be seen, when p belongs to the interval of [20%, 36%), the timeslot structure can fully satisfy the service quality requirement. A case in which p belongs to the interval of (64%, 80%] is the same as a case in which p belongs to the interval of [20%, 36%), and no further details are provided again. Exemplarily, the timeslot structure may be shown in FIG. 10.

Second, switching between the first RF channel and the second RF channel is controlled using the determined timeslot structure.

In conclusion, in the dual band communication method provided in this embodiment, a service type of a service in a switching period is determined according to a preset policy first, and maximum duration of the switching period when the switching period satisfies a service quality requirement is determined according to the determined service type and the preset service quality requirement corresponding to the service type, so as to control switching between a first RF channel and a second RF channel according to the maximum duration when time division multiplexing is performed on a baseband processor, so that actual duration of the switching period is less than or equal to the maximum duration. In addition, the method may also be used to determine a timeslot structure of a beacon period of dual band communication. The beacon period includes at least two switching periods. Duration T of the beacon period, a preset time point t1 at which a first beacon frame is sent, and a preset time point t2 at which a second beacon frame is sent are acquired, a service type of a service in the beacon period is determined then, to determine, using the method described above, maximum duration of any switching period corresponding to the service type, and finally, switching between the first RF channel and the second RF channel is controlled in the beacon period according to T, t1, t2, and the respective maximum duration of the at least two switching periods, so that a sum of respective actual duration of the at least two switching periods is equal to T, t1 is in a first timeslot of any switching period in the beacon period, and t2 is in a second timeslot of any switching period in the beacon period. In this way, the present disclosure can satisfy service quality requirements of services of different types, and can also improve utilization of time resources.

Figure 11:
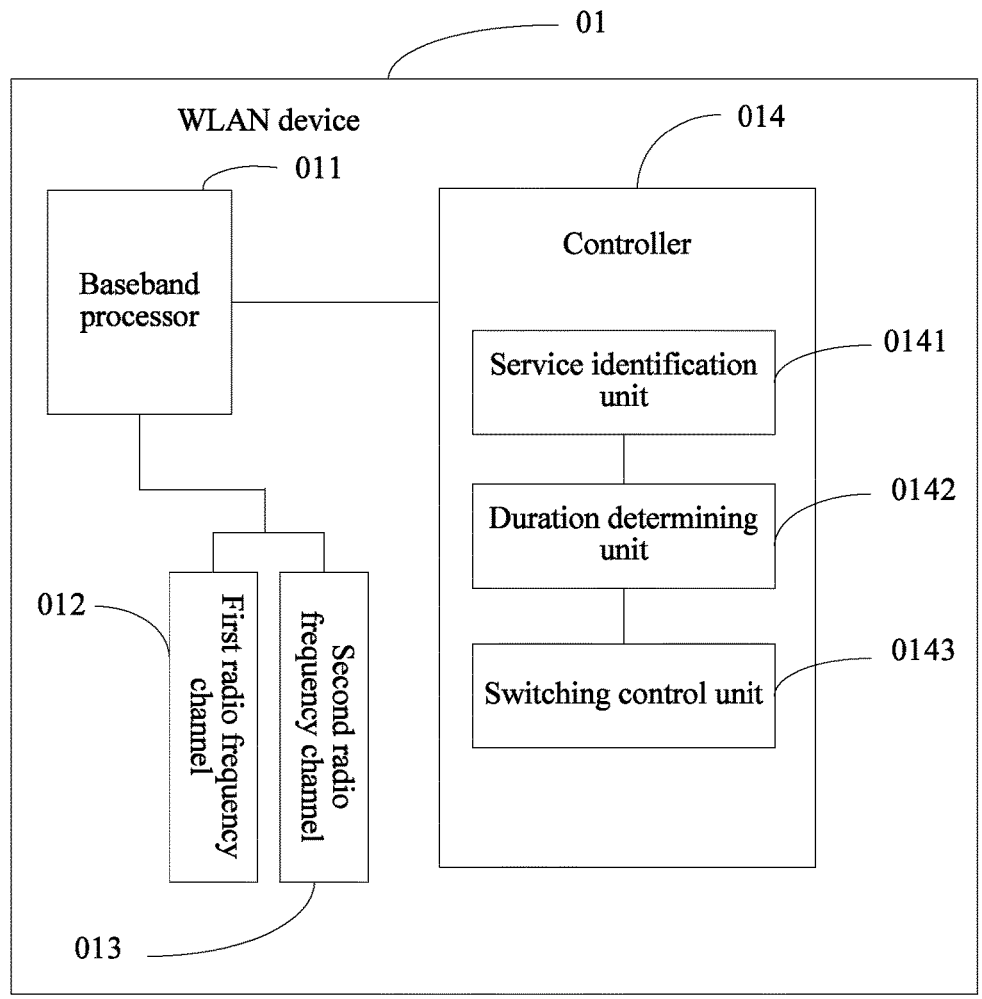
FIG. 11 is a schematic structural diagram of a WLAN device according to an embodiment of the present disclosure.

An embodiment of the present disclosure provides a WLAN device 01. As shown in FIG. 11, the WLAN device 01 includes: a baseband processor 011, a first RF channel 012, and a second RF channel 013, where the first RF channel 012 works at a first band, the second RF channel 013 works at a second band, and the first RF channel 012 and the second RF channel 013 share the baseband processor 011 in a TDM manner; the WLAN device 01 further includes: a controller 014 that is coupled to the first RF channel 012 and the second RF channel 013, where the controller 014 includes: a service identification unit 0141 configured to determine a service type of a service in a switching period according to a preset policy, where the switching period includes one first timeslot in which the first RF channel works and one adjacent second timeslot in which the second RF channel works, and the service type is voice service, video service, or data service; a duration determining unit 0142 configured to determine, according to the determined service type and a preset service quality requirement corresponding to the service type, maximum duration of the switching period in which the service quality requirement is met; and a switching control unit 0143 configured to: when time division multiplexing is performed on the baseband processor, control switching between the first RF channel and the second RF channel according to the maximum duration, so that actual duration of the switching period is less than or equal to the maximum duration.

Optionally, a service in the first timeslot is a service at the first band, and a service in the second timeslot is a service at the second band, and the service identification unit 0141 may be specifically configured to: when respective service types of the service at the first band and the service at the second band include at least voice service, determine that the service type of the service in the switching period is voice service; when respective service types of the service at the first band and the service at the second band include at least video service and do not include voice service, determine that the service type of the service in the switching period is video service; or when respective service types of the service at the first band and the service at the second band include only data service, determine that the service type of the service in the switching period is data service.

Optionally, a previous switching period of the switching period includes a service at the first band and a service at the second band, the service at the first band is a service in a first timeslot of the previous switching period, and the service at the second band is a service in a second timeslot of the previous switching period; and the service identification unit 0141 may be specifically configured to: when respective service types of the service at the first band and the service at the second band in the previous switching period include at least voice service, determine that the service type of the service in the switching period is voice service; when respective service types of the service at the first band and the service at the second band in the previous switching period include at least video service and do not include voice service, determine that the service type of the service in the switching period is video service; or when respective service types of the service at the first band and the service at the second band in the previous switching period include only data service, determine that the service type of the service in the switching period is data service.

Optionally, when the service type is voice service, the preset service quality requirement corresponding to the service type includes: a maximum allowable delay L of a service packet of a voice service, a time L1 in which the service packet of the voice service contends for a wireless channel, and a time L2 for which the service packet of the voice service occupies the wireless channel for transmission, and the duration determining unit 0142 may be specifically configured to: use a difference L3 obtained by subtracting L1 and L2 from L as the maximum duration, where L3=L−L1−L2.

Optionally, when the service type is video service, the preset service quality requirement corresponding to the service type includes: a maximum allowable delay M of a service packet of a video service, a time M1 in which the service packet of the video service contends for a wireless channel, and a time M2 for which the service packet of the video service occupies the wireless channel for transmission, and the duration determining unit 0142 may be specifically configured to: use a difference M3 obtained by subtracting M1 and M2 from M as the maximum duration, where M3=M−M1−M2.

Optionally, if the service type is data service, the preset service quality requirement corresponding to the service type includes a time N reserved in duration information in a CTS-to-Self packet when a CTS-to-Self protection mechanism is started for data service, and the duration determining unit 0142 may be specifically configured to: use 2N as the maximum duration.

This embodiment is used to implement the foregoing method embodiments. For working procedures and working principles of the units in this embodiment, refer to descriptions in the foregoing method embodiments, and no further details are provided herein again.

In conclusion, in the WLAN device provided in this embodiment of the present disclosure, a service type of a service in a switching period is determined according to a preset policy first, where the switching period includes one first timeslot in which a first RF channel works and one adjacent second timeslot in which a second RF channel works; maximum duration of the switching period when the switching period satisfies a service quality requirement is determined according to the determined service type and the preset service quality requirement corresponding to the service type; and when time division multiplexing is performed on a baseband processor, switching between the first RF channel and the second RF channel is controlled according to the maximum duration, so that actual duration of the switching period is less than or equal to the maximum duration. In this way, the present disclosure can satisfy service quality requirements of services of different types, and can also improve utilization of time resources.

Figure 12:
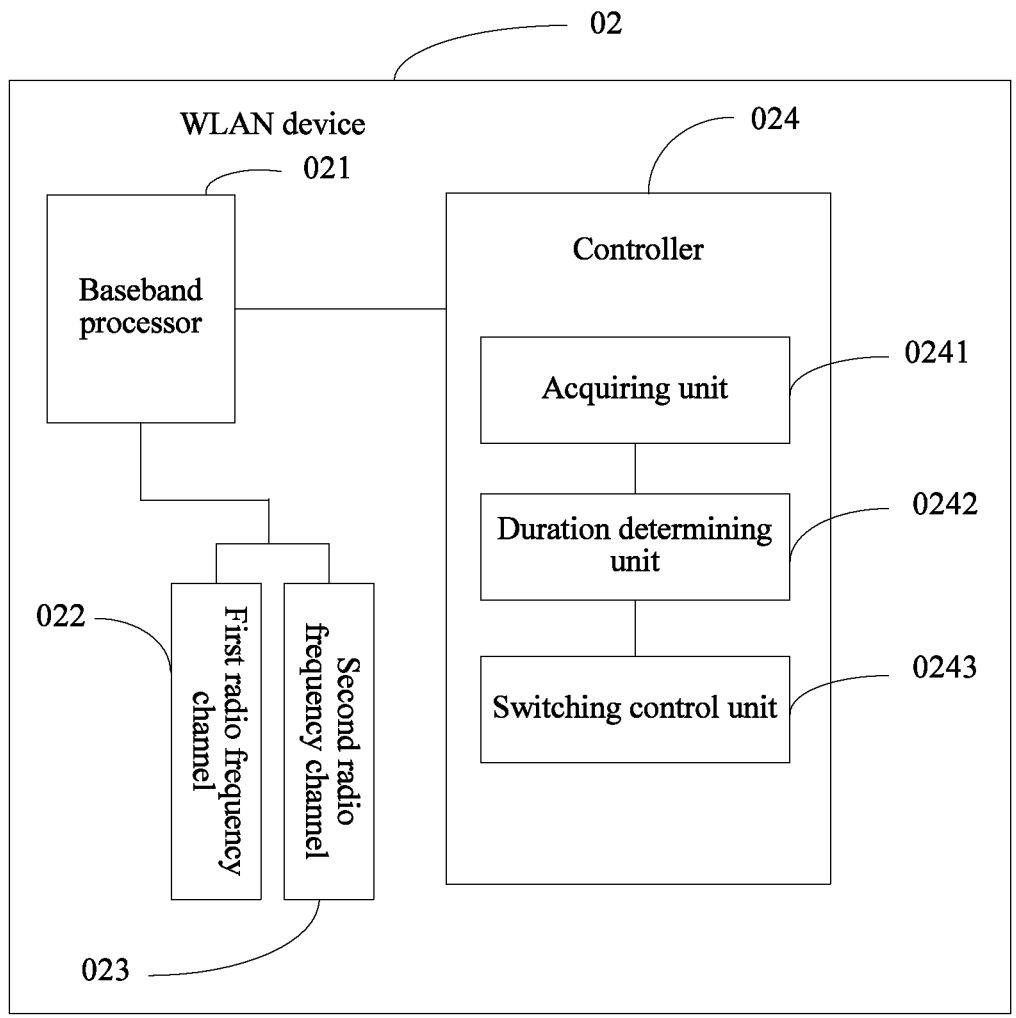
FIG. 12 is a schematic structural diagram of another WLAN device according to an embodiment of the present disclosure.

An embodiment of the present disclosure further provides another WLAN device 02. As shown in FIG. 12, the WLAN device 02 includes: a baseband processor 021, a first RF channel 022, and a second RF channel 023, where the first RF channel 022 works at a first band, the second RF channel 023 works at a second band, and the first RF channel 022 and the second RF channel 023 share the baseband processor 021 in a time division multiplexing manner; the WLAN device 02 further includes: a controller 024 that is coupled to the first RF channel 022 and the second RF channel 023, where the controller 024 includes: an acquiring unit 0241 configured to acquire duration T of a beacon period, a preset time point t1 at which a first beacon frame is sent, and a preset time point t2 at which a second beacon frame is sent, where the beacon period includes at least two switching periods, the first beacon frame is a beacon frame corresponding to a service at the first band, and the second beacon frame is a beacon frame corresponding to a service at the second band; a duration determining unit 0242 configured to determine a service type of a service in the beacon period, where the type of the service in the beacon period is types of services in the at least two switching periods, to determine, using the method described above, maximum duration of any switching period corresponding to the service type; and a switching control unit 0243 configured to control switching between the first RF channel and the second RF channel in the beacon period according to T, t1, t2, and respective maximum duration of the at least two switching periods, so that actual duration of each switching period does not exceed the maximum duration, a sum of respective actual duration of the at least two switching periods is equal to T, t1 is in a first timeslot of any switching period in the beacon period, t2 is in a second timeslot of any switching period in the beacon period, and a time difference between t1 and t2 is less than or equal to a time N reserved in duration information in a CTS-to-Self packet when a CTS-to-Self protection mechanism is started, where the first timeslot is a timeslot in which the first RF channel works, and the second timeslot is a timeslot in which the second RF channel works.

Figure 13:
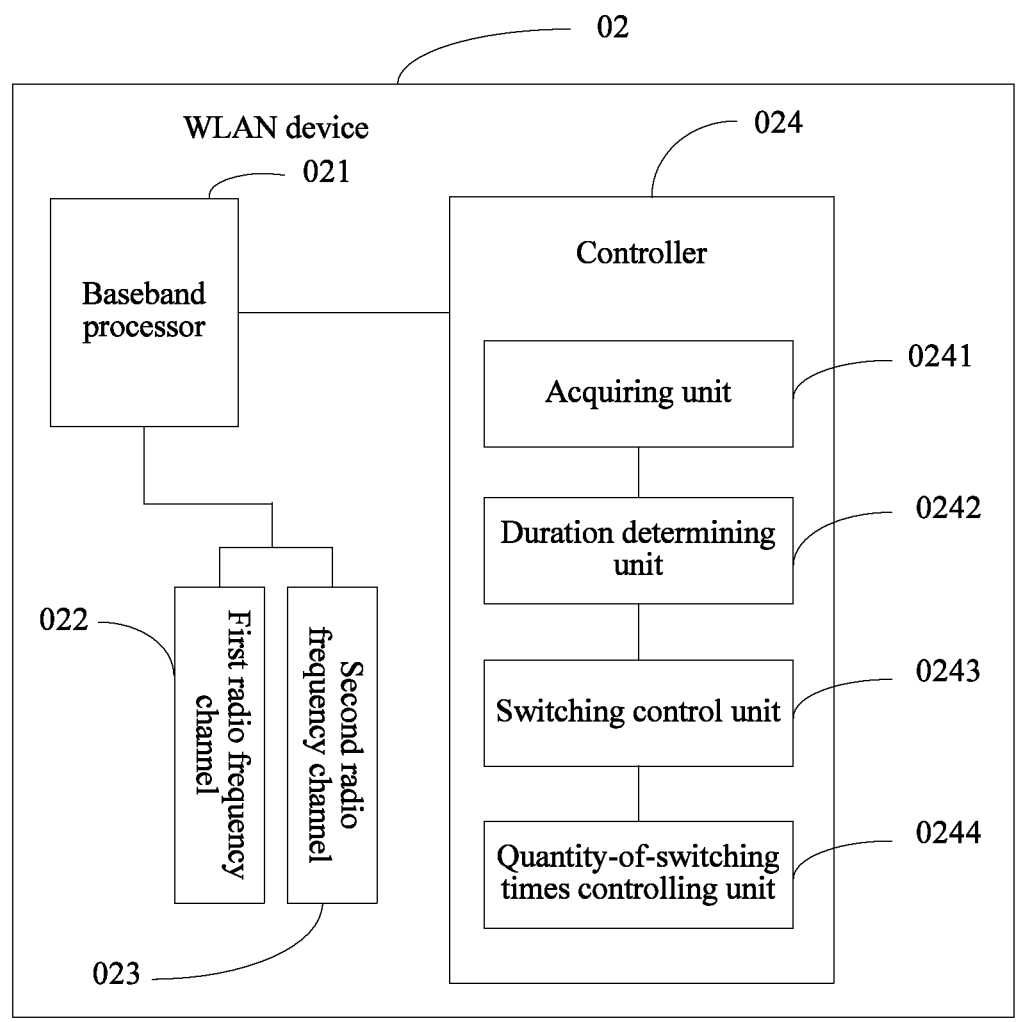
FIG. 13 is a schematic structural diagram of still another WLAN device according to an embodiment of the present disclosure.

Optionally, as shown in FIG. 13, the controller 024 may further include: a quantity-of-switching times controlling unit 0244 configured to determine a minimum quantity of switching times according to a service type of a service in the beacon period and the maximum duration, where the minimum quantity of switching times indicates a quantity of switching times in the at least two switching periods.

Optionally, the quantity-of-switching times controlling unit 0244 may be specifically configured to: when the service type of the service in the beacon period is voice service or video service, divide the duration of the beacon period by the maximum duration to obtain a quotient, round up the quotient, and multiply, by two, a result obtained by rounding up, to obtain the minimum quantity of switching times; or when the service type of the service in the beacon period is data service, acquire the minimum quantity of switching times according to a timeslot proportion of the first timeslot or the second timeslot of any switching period in the beacon period, and a preset correspondence between a timeslot proportion interval and a quantity of switching times, where the timeslot proportion of the first timeslot is a ratio of duration of the first timeslot of any switching period to the actual duration of any switching period, and the timeslot proportion of the second timeslot is a ratio of duration of the second timeslot of any switching period to the actual duration of any switching period.

Optionally, the correspondence between the timeslot proportion interval and the quantity of switching times includes: at least a correspondence between a first quantity of switching times and a first proportion interval, and a correspondence between a second quantity of switching times and another proportion interval except the first proportion interval; and the quantity-of-switching times controlling unit 0244 may be specifically configured to: determine a proportion interval to which the timeslot proportion of the first timeslot or the second timeslot belongs, where when the timeslot proportion of the first timeslot or the second timeslot belongs to the first proportion interval, the minimum quantity of switching times is the first quantity of switching times; or when the timeslot proportion of the first timeslot or the second timeslot does not belong to the first proportion interval, the minimum quantity of switching times is the second quantity of switching times.

This embodiment is used to implement the foregoing method embodiments. For working procedures and working principles of the units in this embodiment, refer to descriptions in the foregoing method embodiments, and no further details are provided herein again.

In conclusion, in the WLAN device provided in this embodiment of the present disclosure, duration T of a beacon period including at least two switching periods, a preset time point t1 at which a first beacon frame is sent, and a preset time point t2 at which a second beacon frame is sent are acquired, a service type of a service in the beacon period is determined then, to determine, using the method described above, maximum duration of any switching period corresponding to the service type, and finally, switching between a first RF channel and a second RF channel is controlled in the beacon period according to T, t1, t2, and the respective maximum duration of the at least two switching periods, so that a sum of respective actual duration of the at least two switching periods is equal to T, t1 is in a first timeslot of any switching period in the beacon period, and t2 is in a second timeslot of any switching period in the beacon period. In this way, the present disclosure can satisfy service quality requirements of services of different types, and can also improve utilization of time resources.

Figure 14:
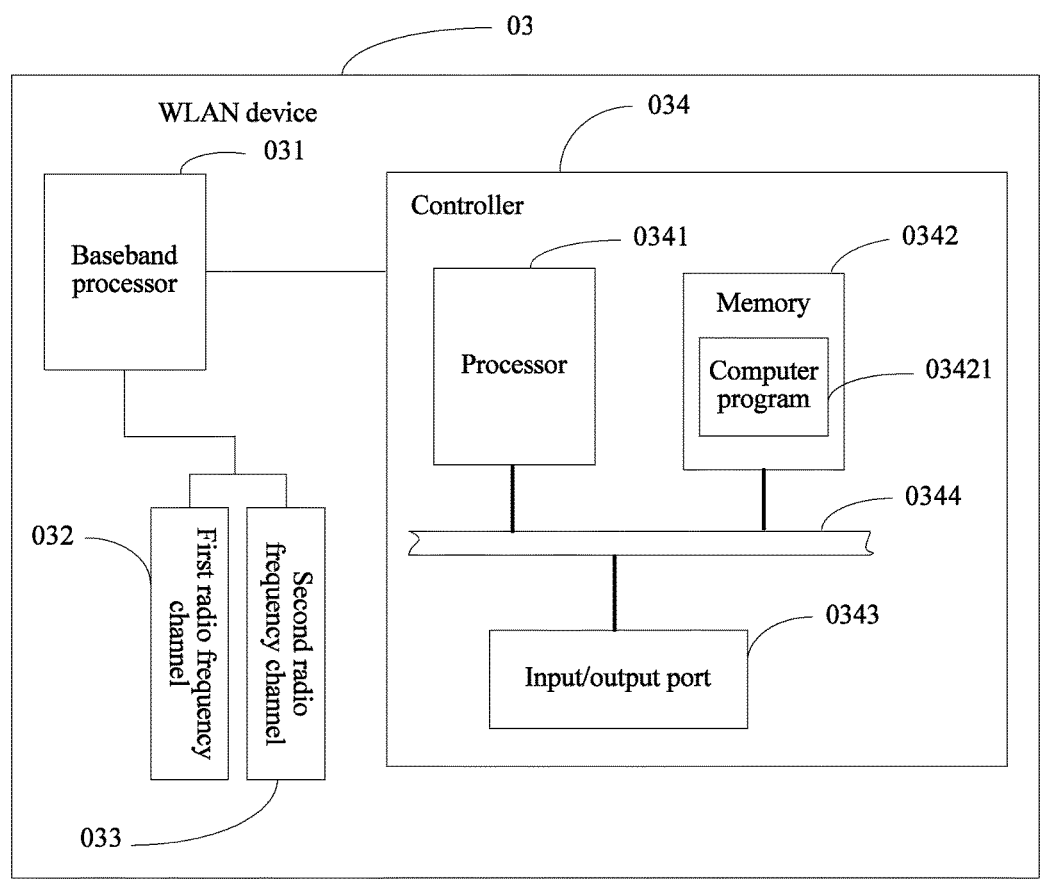
FIG. 14 is a schematic structural diagram of yet another WLAN device according to an embodiment of the present disclosure.

An embodiment of the present disclosure provides still another WLAN device 03. As shown in FIG. 14, the WLAN device may include: a baseband processor 031, a first RF channel 032, and a second RF channel 033, where the first RF channel 032 works at a first band, the second RF channel 033 works at a second band, and the first RF channel 032 and the second RF channel 033 share the baseband processor 031 in a time division multiplexing manner; the WLAN device 03 further includes: a controller 034 that is coupled to the first RF channel 032 and the second RF channel 033, where the controller 034 includes: a processor 0341, a memory 0342, and an input/output (I/O) port 0343, where the processor 0341, the memory 0342, and the input/output (I/O) port 0343 are connected using a bus 0344, the memory 0342 stores a computer program 03421, and the processor 0341 executes the computer program 03421, and is configured to: determine a service type of a service in a switching period according to a preset policy, where the switching period includes one first timeslot in which the first RF channel works and one adjacent second timeslot in which the second RF channel works, and the service type is voice service, video service, or data service; determine, according to the determined service type and a preset service quality requirement corresponding to the service type, maximum duration of the switching period in which the service quality requirement is met; and when time division multiplexing is performed on the baseband processor, control switching between the first RF channel and the second RF channel according to the maximum duration, so that actual duration of the switching period is less than or equal to the maximum duration.

Optionally, a service in the first timeslot is a service at the first band, and a service in the second timeslot is a service at the second band, and the processor 0341 executes the computer program 03421, and may be specifically configured to: when respective service types of the service at the first band and the service at the second band include at least voice service, determine that the service type of the service in the switching period is voice service; when respective service types of the service at the first band and the service at the second band include at least video service and do not include voice service, determine that the service type of the service in the switching period is video service; or when respective service types of the service at the first band and the service at the second band include only data service, determine that the service type of the service in the switching period is data service.

Optionally, a previous switching period of the switching period includes a service at the first band and a service at the second band, the service at the first band is a service in a first timeslot of the previous switching period, and the service at the second band is a service in a second timeslot of the previous switching period; and the processor 0341 executes the computer program 03421, and may be specifically configured to: when respective service types of the service at the first band and the service at the second band in the previous switching period include at least voice service, determine that the service type of the service in the switching period is voice service; when respective service types of the service at the first band and the service at the second band in the previous switching period include at least video service and do not include voice service, determine that the service type of the service in the switching period is video service; or when respective service types of the service at the first band and the service at the second band in the previous switching period include only data service, determine that the service type of the service in the switching period is data service.

Optionally, if the service type is voice service, the preset service quality requirement corresponding to the service type includes: a maximum allowable delay L of a service packet of a voice service, a time L1 in which the service packet of the voice service contends for a wireless channel, and a time L2 for which the service packet of the voice service occupies the wireless channel for transmission, and the processor 0341 executes the computer program 03421, and may be specifically configured to: use a difference L3 obtained by subtracting L1 and L2 from L as the maximum duration, where L3=L−L1−L2.

Optionally, if the service type is video service, the preset service quality requirement corresponding to the service type includes: a maximum allowable delay M of a service packet of a video service, a time M1 in which the service packet of the video service contends for a wireless channel, and a time M2 for which the service packet of the video service occupies the wireless channel for transmission, and the processor 0341 executes the computer program 03421, and may be specifically configured to: use a difference M3 obtained by subtracting M1 and M2 from M as the maximum duration, where M3=M−M1−M2.

Optionally, if the service type is data service, the preset service quality requirement corresponding to the service type includes a time N reserved in duration information in a CTS-to-Self packet when a CTS-to-Self protection mechanism is started for data service, and the processor 0341 executes the computer program 03421, and may be specifically configured to: use 2N as the maximum duration.

This embodiment is used to implement the foregoing method embodiments. For working procedures and working principles of the units in this embodiment, refer to descriptions in the foregoing method embodiments, and no further details are provided herein again.

In conclusion, in the WLAN device provided in this embodiment of the present disclosure, a service type of a service in a switching period is determined according to a preset policy first, where the switching period includes one first timeslot in which a first RF channel works and one adjacent second timeslot in which a second RF channel works; maximum duration of the switching period when the switching period satisfies a service quality requirement is determined according to the determined service type and the preset service quality requirement corresponding to the service type; and when time division multiplexing is performed on a baseband processor, switching between the first RF channel and the second RF channel is controlled according to the maximum duration, so that actual duration of the switching period is less than or equal to the maximum duration. In this way, the present disclosure can satisfy service quality requirements of services of different types, and can also improve utilization of time resources.

Figure 15:
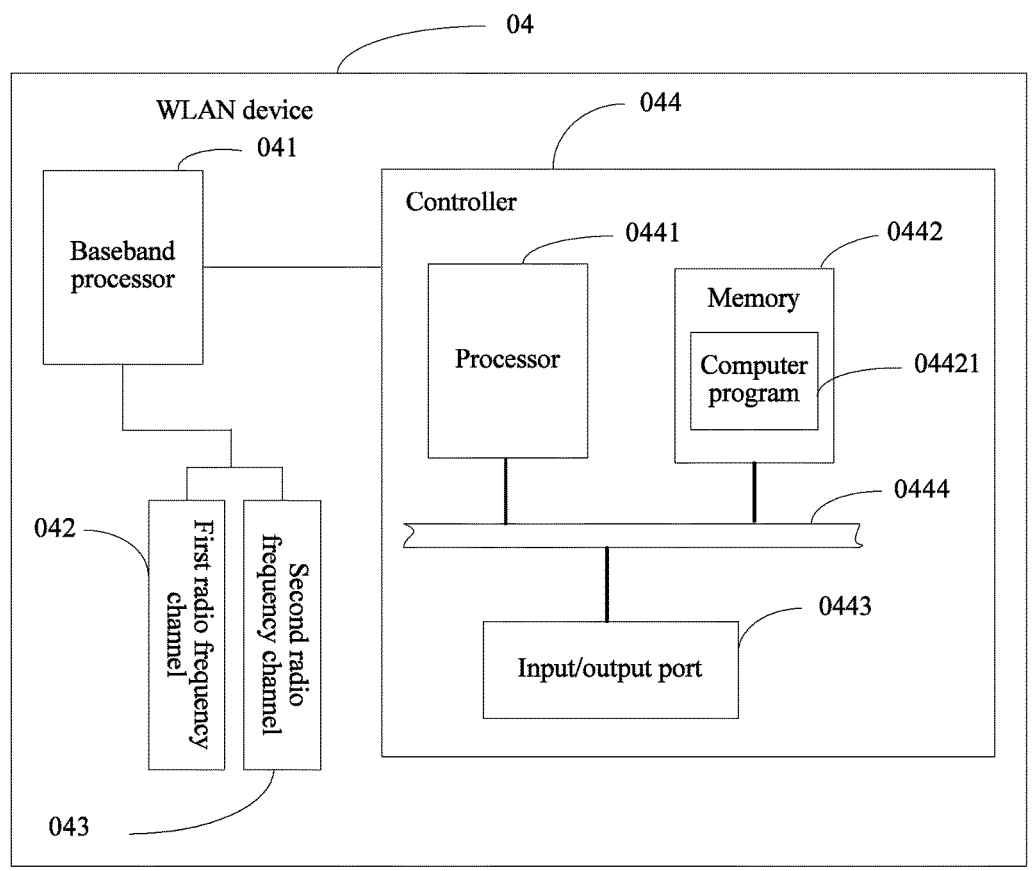
FIG. 15 is a schematic structural diagram of still yet another WLAN device according to an embodiment of the present disclosure.

An embodiment of the present disclosure provides yet another WLAN device 04. As shown in FIG. 15, the WLAN device may include: a baseband processor 041, a first RF channel 042, and a second RF channel 043, where the first RF channel 042 works at a first band, the second RF channel 043 works at a second band, and the first RF channel 042 and the second RF channel 043 share the baseband processor 041 in a time division multiplexing manner; the WLAN device 04 further includes: a controller 044 that is coupled to the first RF channel 042 and the second RF channel 043, where the controller 044 includes: a processor 0441, a memory 0442, and an input/output (I/O) port 0443, where the processor 0441, the memory 0442, and the input/output (I/O) port 0443 are connected using a bus 0444, the memory 0442 stores a computer program 04421, and the processor 0441 executes the computer program 04421, and is configured to: acquire duration T of a beacon period, a preset time point t1 at which a first beacon frame is sent, and a preset time point t2 at which a second beacon frame is sent, where the beacon period includes at least two switching periods, the first beacon frame is a beacon frame corresponding to a service at the first band, and the second beacon frame is a beacon frame corresponding to a service at the second band; determine a service type of a service in the beacon period, where the type of the service in the beacon period is types of services in the at least two switching periods, to determine, using the method described above, maximum duration of any switching period corresponding to the service type; and control switching between the first RF channel and the second RF channel in the beacon period according to T, t1, t2, and respective maximum duration of the at least two switching periods, so that actual duration of each switching period does not exceed the maximum duration, a sum of respective actual duration of the at least two switching periods is equal to T, t1 is in a first timeslot of any switching period in the beacon period, t2 is in a second timeslot of any switching period in the beacon period, and a time difference between t1 and t2 is less than or equal to a time N reserved in duration information in a CTS-to-Self packet when a CTS-to-Self protection mechanism is started, where the first timeslot is a timeslot in which the first RF channel works, and the second timeslot is a timeslot in which the second RF channel works.

Optionally, the processor 0441 executes the computer program 04421, and is further configured to: determine a minimum quantity of switching times according to the service type of the service in the beacon period and the maximum duration, where the minimum quantity of switching times indicates a quantity of switching times in the at least two switching periods.

Optionally, the processor 0441 executes the computer program 04421, and may be specifically configured to: when the service type of the service in the beacon period is voice service or video service, divide the duration of the beacon period by the maximum duration to obtain a quotient, round up the quotient, and multiply, by two, a result obtained by rounding up, to obtain the minimum quantity of switching times; or when the service type of the service in the beacon period is data service, acquire the minimum quantity of switching times according to a timeslot proportion of the first timeslot or the second timeslot of any switching period in the beacon period, and a preset correspondence between a timeslot proportion interval and a quantity of switching times, where the timeslot proportion of the first timeslot is a ratio of duration of the first timeslot of any switching period to the actual duration of any switching period, and the timeslot proportion of the second timeslot is a ratio of duration of the second timeslot of any switching period to the actual duration of any switching period.

Optionally, the correspondence between the timeslot proportion interval and the quantity of switching times includes: at least a correspondence between a first quantity of switching times and a first proportion interval, and a correspondence between a second quantity of switching times and another proportion interval except the first proportion interval; and the processor 0441 executes the computer program 04421, and may be specifically configured to: determine a proportion interval to which the timeslot proportion of the first timeslot or the second timeslot belongs, where when the timeslot proportion of the first timeslot or the second timeslot belongs to the first proportion interval, the minimum quantity of switching times is the first quantity of switching times; or when the timeslot proportion of the first timeslot or the second timeslot does not belong to the first proportion interval, the minimum quantity of switching times is the second quantity of switching times.

This embodiment is used to implement the foregoing method embodiments. For working procedures and working principles of the units in this embodiment, refer to descriptions in the foregoing method embodiments, and no further details are provided herein again.

In conclusion, in the WLAN device provided in this embodiment of the present disclosure, duration T of a beacon period including at least two switching periods, a preset time point t1 at which a first beacon frame is sent, and a preset time point t2 at which a second beacon frame is sent are acquired, a service type of a service in the beacon period is determined then, to determine, using the method described above, maximum duration of any switching period corresponding to the service type, and finally, switching between a first RF channel and a second RF channel is controlled in the beacon period according to T, t1, t2, and the respective maximum duration of the at least two switching periods, so that a sum of respective actual duration of the at least two switching periods is equal to T, t1 is in a first timeslot of any switching period in the beacon period, and t2 is in a second timeslot of any switching period in the beacon period. In this way, the present disclosure can satisfy service quality requirements of services of different types, and can also improve utilization of time resources.

In addition, the baseband processors described in the embodiments of the present disclosure may be a WLAN processing chip. The WLAN processing chip may include: a MAC layer processing module, a PHY layer processing module, and a RF module. The RF module may include a first RF channel (a 2.4 GHz RF channel) and a second RF channel (a 5 GHz RF channel), where the 2.4 GHz RF channel performs communication using a 2.4 GHz antenna, and the 5 GHz RF channel performs communication using a 5 GHz antenna. The RF channels at the two bands are connected to the PHY processing module using a switching switch.

In the several embodiments provided in the present disclosure, it should be understood that the disclosed method and apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A dual band communication method applied in a wireless local area network (WLAN) device, wherein the WLAN device comprises a baseband processor configured to process a first radio frequency channel and a second radio frequency channel, wherein the first radio frequency channel is on a first band, wherein the second radio frequency channel is on a second band, wherein the first radio frequency channel and the second radio frequency channel share the baseband processor in a time division multiplexing (TDM) manner, and wherein the method comprises:

determining a service type of a service in a switching period according to a preset policy, wherein the switching period comprises one first timeslot for the first radio frequency channel and one adjacent second timeslot for the second radio frequency channel, wherein a service in the first timeslot is a service on the first band, wherein a service in the second timeslot is a service on the second band, and wherein determining the service type of the service in the switching period according to a preset policy comprises determining that the service type of the service in the switching period is voice service when the respective service types of the service on the first band and the service on the second band comprise at least voice service;

determining, according to the determined service type and a preset service quality requirement corresponding to the service type, a maximum duration of the switching period in which the preset service quality requirement is met, wherein when the service type is voice service, the preset service quality requirement corresponding to the service type comprises a maximum allowable delay L of a service packet of a voice service, a time L1 in which the service packet of the voice service contends for a wireless channel, and a time L2 for which the service packet of the voice service occupies the wireless channel for transmission, and wherein determining, according to the determined service type and the preset service quality requirement corresponding to the service type, the maximum duration of the switching period in which the preset service quality requirement is met comprises using a difference L3 obtained by subtracting L1 and L2 from L as the maximum duration; and controlling switching between the first radio frequency channel and the second radio frequency channel according to the maximum duration when time division multiplexing is performed on the baseband processor, so that an actual duration of the switching period is less than or equal to the maximum duration.

2. The method according to claim 1, wherein determining the service type of the service in the switching period according to a preset policy further comprises determining that the service type of the service in the switching period is video service when respective service types of the service on the first band and the service on the second band comprise at least video service and do not comprise voice service.

3. The method according to claim 1, wherein determining the service type of the service in the switching period according to a preset policy further comprises determining that the service type of the service in the switching period is data service when respective service types of the service on the first band and the service on the second band comprise only data service.

4. The method according to claim 1, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein determining the service type of the service in the switching period according to a preset policy comprises determining that the service type of the service in the switching period is voice service when respective service types of the service on the first band and the service on the second band in the previous switching period comprise at least voice service.

5. The method according to claim 1, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein determining the service type of the service in the switching period according to a preset policy comprises determining that the service type of the service in the switching period is video service when respective service types of the service on the first band and the service on the second band in the previous switching period comprise at least video service and do not comprise voice service.

6. The method according to claim 1, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein determining the service type of the service in the switching period according to a preset policy comprises determining that the service type of the service in the switching period is data service when respective service types of the service on the first band and service on the second band in the previous switching period comprise only data service.

7. The method according to claim 2, wherein when the service type is video service, the preset service quality requirement corresponding to the service type further comprises a maximum allowable delay M of a service packet of a video service, a time M1 in which the service packet of the video service contends for a wireless channel, and a time M2 for which the service packet of the video service occupies the wireless channel for transmission, and wherein determining, according to the determined service type and the preset service quality requirement corresponding to the service type, the maximum duration of the switching period in which the preset service quality requirement is met comprises using a difference M3 obtained by subtracting M1 and M2 from M as the maximum duration.

8. The method according to claim 3, wherein the preset service quality requirement corresponding to the service type comprises a time N reserved in duration information in a clear to send-to-self (CTS-to-Self) packet when the service type is data service and when a CTS-to-Self protection mechanism is started for data service, and wherein determining, according to the determined service type and a preset service quality requirement corresponding to the service type, the maximum duration of the switching period in which the preset service quality requirement is met comprises using 2N as the maximum duration.

9. A dual band communication method applied in a wireless local area network (WLAN) device, wherein the WLAN device comprises a baseband processor configured to process a first radio frequency channel and a second radio frequency channel, wherein the first radio frequency channel is on a first band, wherein the second radio frequency channel is on a second band, wherein the first radio frequency channel and the second radio frequency channel share the baseband processor in a time division multiplexing (TDM) manner, and wherein the method comprises:
  acquiring a duration T of a beacon period, a preset time point t1 at which a first beacon frame is sent, and a preset time point t2 at which a second beacon frame is sent, wherein the beacon period comprises at least two switching periods, wherein the first beacon frame is a beacon frame corresponding to a service on the first band, and wherein the second beacon frame is a beacon frame corresponding to a service on the second band;
  determining a service type of a service in the beacon period, wherein the service type of the service in the beacon period is types of services in the at least two switching periods, thereby determining, according to the determined service type and a preset service quality requirement corresponding to the service type, a maximum duration of any switching period corresponding to the service type in which the reset service quality requirement is met; and
  controlling switching between the first radio frequency channel and the second radio frequency channel in the beacon period according to T, t1, t2, and respective maximum duration of the at least two switching periods, so that an actual duration of each switching period does not exceed the maximum duration, wherein a sum of the actual durations of the at least two switching periods is equal to T, wherein t1 is in a first timeslot of any switching period in the beacon period, wherein t2 is in a second timeslot of any switching period in the beacon period, wherein a time difference between t1 and t2 is less than or equal to a time N reserved in duration information in a clear to send-to-self (CTS-to-Self) packet when a CTS-to-Self protection mechanism is started, wherein the first timeslot is a timeslot for the first radio frequency channel, and wherein the second timeslot is a timeslot for the second radio frequency channel.

10. The method according to claim 9, further comprising determining a minimum quantity of switching times according to the service type of the service in the beacon period and the maximum duration, wherein the minimum quantity of switching times indicates a quantity of switching times in the at least two switching periods.

11. The method according to claim 10, wherein determining the minimum quantity of switching times according to the service type of the service in the beacon period and the maximum duration comprises dividing a duration of the beacon period by the maximum duration to obtain a quotient, rounding up the quotient, and multiplying, by two, a result obtained by rounding up, to obtain the minimum quantity of switching times when the service type of the service in the beacon period is voice service or video service.

12. The method according to claim 10, wherein determining the minimum quantity of switching times according to the service type of the service in the beacon period and the maximum duration comprises acquiring the minimum quantity of switching times according to a timeslot proportion of the first timeslot or the second timeslot of any switching period in the beacon period, and a preset correspondence between a timeslot proportion interval and a quantity of switching times when the service type of the service in the beacon period is data service, wherein the timeslot proportion of the first timeslot is a ratio of duration of the first timeslot of any switching period to the actual duration of any switching period, and wherein the timeslot proportion of the second timeslot is a ratio of duration of the second timeslot of any switching period to the actual duration of any switching period.

13. A wireless local area network (WLAN) device, wherein the WLAN device comprises:
  a baseband processor configured to process a first radio frequency channel and a second radio frequency channel, wherein the first radio frequency channel is on a first band, wherein the second radio frequency channel is on a second band, and wherein the first radio frequency channel and the second radio frequency channel share the baseband processor in a time division multiplexing (TDM) manner,
  a controller coupled to the baseband processor, wherein the controller comprises a processor configured to:
    determine a service type of a service in a switching period according to a preset policy, wherein the switching period comprises one first timeslot for the first radio frequency channel and one adjacent second timeslot for the second radio frequency channel, and wherein a service in the first timeslot is a service on the first band, wherein a service in the second timeslot is a service on the second band;
    determine that the service type of the service in the switching period is voice service when respective service types of the service on the first band and the service on the second band comprise at least voice service;
    determine, according to the determined service type and a preset service quality requirement corresponding to the service type, a maximum duration of the switching period in which the preset service quality requirement is met, wherein when the service type is voice service, wherein the preset service quality requirement corresponding to the service type comprises a maximum allowable delay L of a service packet of a voice service, a time L1 in which the service packet of the voice service contends for a wireless channel, and a time L2 for which the service packet of the voice service occupies the wireless channel for transmission;
    use a difference L3 obtained by subtracting L1 and L2 from L as the maximum duration; and
    control switching between the first radio frequency channel and the second radio frequency channel according to the maximum duration when time division multiplexing is performed on the baseband processor, so that a actual duration of the switching period is less than or equal to the maximum duration.

14. The WLAN device according to claim 13, wherein the processor is further configured to:
  determine that the service type of the service in the switching period is video service when respective service types of the service on the first band and the service on the second band comprise at least video service and do not comprise voice service; or
  determine that the service type of the service in the switching period is data service when respective service types of the service on the first band and the service on the second band comprise only data service.

15. The WLAN device according to claim 13, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein the processor is further configured to determine that the service type of the service in the switching period is voice service when respective service types of the service on the first band and the service on the second band in the previous switching period comprise at least voice service.

16. The WLAN device according to claim 14, wherein when the service type is video service, the preset service quality requirement corresponding to the service type comprises a maximum allowable delay M of a service packet of a video service, a time M1 in which the service packet of the video service contends for a wireless channel, and a time M2 for which the service packet of the video service occupies the wireless channel for transmission, and wherein the processor is further configured to use a difference M3 obtained by subtracting M1 and M2 from M as the maximum duration.

17. The WLAN device according to claim 14, wherein the preset service quality requirement corresponding to the service type comprises a time N reserved in duration information in a clear to send-to-self (CTS-to-Self) packet when a clear to CTS-to-Self protection mechanism is started for data service and when the service type is data service, and wherein the processor is further configured to use 2N as the maximum duration.

18. A wireless local area network (WLAN) device, wherein the WLAN device comprises:
a baseband processor configured to process a first radio frequency channel and a second radio frequency channel, wherein the first radio frequency channel is on a first band, the second radio frequency channel is on a second band, and the first radio frequency channel and the second radio frequency channel share the baseband processor in a time division multiplexing manner;
a controller that is coupled to the baseband processor, wherein the controller comprises a processor configured to:
acquire duration T of a beacon period, a preset time point t1 at which a first beacon frame is sent, and a preset time point t2 at which a second beacon frame is sent, wherein the beacon period comprises at least two switching periods, wherein the first beacon frame is a beacon frame corresponding to a service on the first band, and wherein the second beacon frame is a beacon frame corresponding to a service on the second band;
determine a service type of a service in the beacon period, wherein the service type of the service in the beacon period is types of services in the at least two switching periods;
determine a maximum duration of any switching period corresponding to the service type; and
control switching between the first radio frequency channel and the second radio frequency channel in the beacon period according to T, t1, t2, and respective maximum duration of the at least two switching periods, so that an actual duration of each switching period does not exceed the maximum duration, wherein a sum of the actual durations of the at least two switching periods is equal to T, wherein t1 is in a first timeslot of any switching period in the beacon period, wherein t2 is in a second timeslot of any switching period in the beacon period, wherein a time difference between t1 and t2 is less than or equal to a time N reserved in duration information in a clear to send-to-self (CTS-to-Self) packet when a CTS-to-Self protection mechanism is started, wherein the first timeslot is a timeslot for the first radio frequency channel, and wherein the second timeslot is a timeslot for the second radio frequency channel.

19. The WLAN device according to claim 18, wherein the processor is further configured to determine a minimum quantity of switching times according to the service type of the service in the beacon period and the maximum duration, and wherein the minimum quantity of switching times indicates a quantity of switching times in the at least two switching periods.

20. The WLAN device according to claim 19, wherein the processor is further configured to:
divide the duration T of the beacon period by the maximum duration to obtain a quotient, round up the quotient, and multiply, by two, a result obtained by rounding up, to obtain the minimum quantity of switching times when the service type of the service in the beacon period is voice service or video service; or
acquire the minimum quantity of switching times according to a timeslot proportion of the first timeslot or the second timeslot of any switching period in the beacon period and a preset correspondence between a timeslot proportion interval and a quantity of switching times when the service type of the service in the beacon period is data service, wherein the timeslot proportion of the first timeslot is a ratio of duration of the first timeslot of any switching period to the actual duration of any switching period, and wherein the timeslot proportion of the second timeslot is a ratio of duration of the second timeslot of any switching period to the actual duration of any switching period.

21. The WLAN device according to claim 20, wherein the preset correspondence between the timeslot proportion interval and the quantity of switching times comprises a correspondence between a first quantity of switching times and a first proportion interval and a correspondence between a second quantity of switching times and another proportion interval except the first proportion interval, wherein the processor is further configured to determine a proportion interval to which the timeslot proportion of the first timeslot or the second timeslot belongs, wherein either the minimum quantity of switching times is the first quantity of switching times when the timeslot proportion of the first timeslot or the second timeslot belongs to the first proportion interval, or the minimum quantity of switching times is the second quantity of switching times when the timeslot proportion of the first timeslot or the second timeslot does not belong to the first proportion interval.

22. The method according to claim 12, wherein the preset correspondence between the timeslot proportion interval and the quantity of switching times comprises a correspondence between a first quantity of switching times and a first proportion interval and a correspondence between a second quantity of switching times and another proportion interval except the first proportion interval, wherein acquiring the minimum quantity of switching times according to the timeslot proportion of the first timeslot or the second timeslot of any switching period in the beacon period and the preset correspondence between the timeslot proportion interval and the quantity of switching times comprises determining a proportion interval to which the timeslot proportion of the first timeslot or the second timeslot belongs, wherein the minimum quantity of switching times is the first quantity of switching times when the timeslot proportion of the first timeslot or the second timeslot belongs to the first proportion interval, and wherein the minimum quantity of switching times is the second quantity of switching times when the timeslot proportion of the first timeslot or the second timeslot does not belong to the first proportion interval.

23. The WLAN device according to claim 13, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein the processor is further configured to determine that the service type of the service in the switching period is video service when respective service types of the service on the first band and the service on the second band in the previous switching period comprise at least video service and do not comprise voice service.

24. The WLAN device according to claim 13, wherein services in a previous switching period of the switching period comprise a service on the first band and a service on the second band, wherein the service on the first band is a service in a first timeslot of the previous switching period, wherein the service on the second band is a service in a second timeslot of the previous switching period, and wherein the processor is further configured to determine that the service type of the service in the switching period is data service when respective service types of the service on the first band and the service on the second band in the previous switching period comprise only data service.

* * * * *